(12) United States Patent
Yanik et al.

(10) Patent No.: US 7,269,313 B2
(45) Date of Patent: Sep. 11, 2007

(54) ULTRA-SLOW DOWN AND STORAGE OF LIGHT PULSES, AND ALTERING OF PULSE SPECTRUM

(75) Inventors: Mehmet Fatih Yanik, Stanford, CA (US); Shanhui Fan, Palo Alto, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/001,492

(22) Filed: Nov. 30, 2004

(65) Prior Publication Data

US 2006/0115212 A1    Jun. 1, 2006

(51) Int. Cl.
*G02B 6/26* (2006.01)
*G02F 1/295* (2006.01)

(52) U.S. Cl. ............................ 385/27; 385/8; 385/15
(58) Field of Classification Search .............. 385/8, 385/15, 27; 359/264; 398/189
See application file for complete search history.

(56) References Cited

U.S. PATENT DOCUMENTS

| | | | | |
|---|---|---|---|---|
| 6,407,846 | B1* | 6/2002 | Myers et al. | 359/239 |
| 7,061,335 | B2 | 6/2006 | Maleki et al. | |
| 7,116,864 | B2* | 10/2006 | Yanik et al. | 385/27 |
| 2002/0131112 | A1* | 9/2002 | Hait | 359/124 |
| 2002/0172456 | A1* | 11/2002 | Hosomi et al. | 385/27 |
| 2003/0231826 | A1 | 12/2003 | Boyd et al. | |
| 2004/0100675 | A1* | 5/2004 | Matsko et al. | 359/245 |
| 2005/0074200 | A1* | 4/2005 | Savchenkov et al. | 385/15 |

OTHER PUBLICATIONS

Boiler, K. J., et al, "Observation of Electromagnetically Induced Transparency", *Phys. Rev. Lett.* 66, 2593 (1991).
Lukin, M. D. and Imamoglu, A. "Controlling photons using electromagnetically induced transparency", *Nature*, 413,273 (2001).
Duan, L. M. et al, "Long-distance quantum communication with atomic ensembles and linear optics", *Nature* 414,413 (2001).
Kasapi A., et al, "Electromagnetically Induced Transparency: Propagation Dynamics", *Phys. Rev. Lett.* 74,2447 (1995).

(Continued)

*Primary Examiner*—Michelle Connelly-Cushwa
*Assistant Examiner*—Rhonda S. Peace
(74) *Attorney, Agent, or Firm*—Davis Wright Tremaine LLP

(57) ABSTRACT

Light pulses can be stopped and stored coherently, with an all-optical process that involves an adiabatic and reversible pulse bandwidth compression occurring entirely in the optical domain. Such a process overcomes the fundamental bandwidth-delay constraint in optics, and can generate arbitrarily small group velocities for light pulses with a given bandwidth, without the use of any coherent or resonant light-matter interactions. This is accomplished only by small refractive index modulations performed at moderate speeds and has applications ranging from quantum communications and computing to coherent all-optical memory devices. A complete time reversal and/or temporal/spectral compression and expansion operation on any electromagnetic field is accomplished using only small refractive index modulations and linear optical elements. This process does not require any nonlinear multi-photon processes such as four-wave mixing and thus can be implemented using on-chip tunable microcavity complexes in photonic crystals. The tuning process requires only small refractive index modulations, and moderate modulation speeds without requiring any high-speed electronic sampling.

52 Claims, 11 Drawing Sheets

OTHER PUBLICATIONS

Hau, L. V., et al. "Light speed reduction to 17 metres per second in an ultracold atomic gas", *Nature* 397, 594 (1999).

Kash, M. M. et al "Ultraslow Group Velocity and Enhanced Nonlinear Optical Effects in a Coherently Driven Hot Atomic Gas", *Phys. Rev. Lett.* 82, 5229 (1999).

Budker, D., et al "Nonlinear Magneto-Optics and Reduced Group Velocity of Light in Atomic Vapor with Slow Ground State Relaxation", *Phys. Rev. Lett.* 83, 1767 (1999).

Liu, C., et al. "Observation of coherently optical information in an atomic medium using halted light pulses", *Nature* 409, 490 (2001).

Phillips, D. F., et al., "Storage of Light in Atomic Vapor", *Phys. Rev. Lett.* 86, 783 (2001).

Turukhin, A. V., et al, "Observation of Ultraslow and Stored Light Pulses in a Solid", *Phys. Rev. Lett.* 88, 236021 (2002).

Bigelow, M.S., et al, "Superluminal and Slow Light Propagation in a Room-temperature Solid", *Phys. Rev. Lett.* 90,113903 (2003).

Yamamoto, Y. et al., "Optical Processes in Microcavities", *Phys. Today* 46, 66 (1993).

Yablonovitch, E., "Inhibited Spontaneous Emission in Solid-State Physics and Electronics", *Phys. Rev. Lett.* 58, 2059-2062 (1987).

John, S., "Strong Localization of Photons in Certain Disordered Dielectric Superlattices", *Phys. Rev. Lett.* 58, 2486-2489 (1987).

Notomi, M., et al., "Extremely Large Group-Velocity Dispersion of Line-Defect Waveguides in Photonic Crystal Slabs", *Phys. Rev. Lett.* 87, 253902 (2001).

Stefanou, N. et al., "Impurity bands in photonic insulators", *Phys. Rev. B* 57, 12127 (1998).

Yariv, A. et al., "Coupled-resonator optical waveguide: a proposal and analysis", *Opt. Lett.* 24, 711-713 (1999).

Bayindir, M. et al., Tight Binding Description of the Coupled Defect Modes in Three Dimensional Photonic Crystals, *Phys. Rev. Lett.* 84, 2140-2143 (2000).

Lenz, G. et al., "Optical Delay Lines Based on Optical Filters", *IEEE Journal of Quantum Electronics* 37, 525 (2001).

Fink, M. "Time reversal of Ultrasonic Fields-Part I: Basic Principles", *IEEE Trans. Ultrason., Ferroelec, Freq. Contr.*, 39, 555 (1992).

F. Wu, et al, "Time reversal of Ultrasonic fields-Part II: Experimental Results", *IEEE Trans. Ultrason. Ferroelec, Freq. Contr.*, 39, 567 (1992).

Freund, I. "Time-reversal symmetry and image reconstruction through multiple-scattering media", *J. Opt. Soc. Am. A*, 9, 456, 1992.

de Rosny, J., et al, "Overcoming the Diffraction Limit in Wave Physics Using a Time-Reversal Mirror and a Novel Acoustic Sink", *Phys. Rev. Lett.* 89,124301 (2002).

Marom, D. J., et al. "Real-Time Spatial-Temporal Signal Processing with Optical nonlinearities", *IEEE Journal of Quantum Elec*, 7, 683 (2001).

Armani, D. K., et al. "Ultra-high-$Q$ toroid microcavity on a chip", *Nature*, vol. 421, Feb. 2003.

Reed, E. J., et al., "Color of Shock Waves in Photonic Crystals", *Phys. Rev. Lett*, vol. 90, No. 20, (2003).

Noda, S. et al., "Trapping and emission of photons by a single defect in a photonic bandgap structure", Nature, vol. 407, Oct. 2000.

André, A. et al., "Manipulating Light Pulses via Dynamically Controlled Photonic Band gap", *Phys. Rev. Lett*, vol. 89, No. 4 (2002).

Y. Xu et al. "Scattering-theory analysis of waveguide-resonator coupling", *Phys. Rev. E* 62, 7389 (2000).

Yanik, M. F., Fan, S et al., "All Optical Transitor Action with bistable switching in a photonic crystal cross-waveguide geometry," *Optics Letters*, vol. 28, pp. 2506-2508 (2003).

Solijacic et al., "Photonic-crystal slow-light enhancement of nonlinear phase sensitivity", *J. Opt. Soc. Am. B*/vol. 9 Sep. 2002.

Yanik M. F., S. Fan, "Stopping Light All Optically", *Phys. Rev. Lett.* 92, 083901 (2004).

Schmidt-Kaler, F. et. al. "Realization of the Cirac-Zoller controlled-NOT quantum gate", *Nature*, vol. 422, 408-411 (2003).

Yanik, M. F. et al., "Stopping Light in a Waveguide with an All-Optical Analog of Electromagnetically Induced Transparency", *Phys. Rev. Lett*, 93, 233903, (2004).

Yanik, M. F., Fan, S. "Time Reversal of Light with Linear Optics and Modulators", *Phys. Rev. Lett*, vol. 93, No. 17, (2004).

Lukin, M.D. et al., "Entanglement of Atomic Ensembles by Trapping Correlated Photon States", *Phys. Rev. Lett*, vol. 84, No. 18 (2000).

Reed, E. J., "Reversed Doppler Effect In Photonic Crystals", *Phys. Rev. Lett*, vol. 91, No. 13, (2003).

Yanik, M. F., et al., "Stopping and storing Light Coherently", *Physical Review* A71, 013803 (2005).

U.S. Appl. No. 11/00,679, "Stopping and Time Reversing Light in a Waveguide with an All-Optical System", filed Nov. 30, 2004.

Yanik, M. F. et al., "On-Chip All-Optical Stopping and Coherent Storage of Light", Glintzon Laboratory, Stanford University.

\* cited by examiner

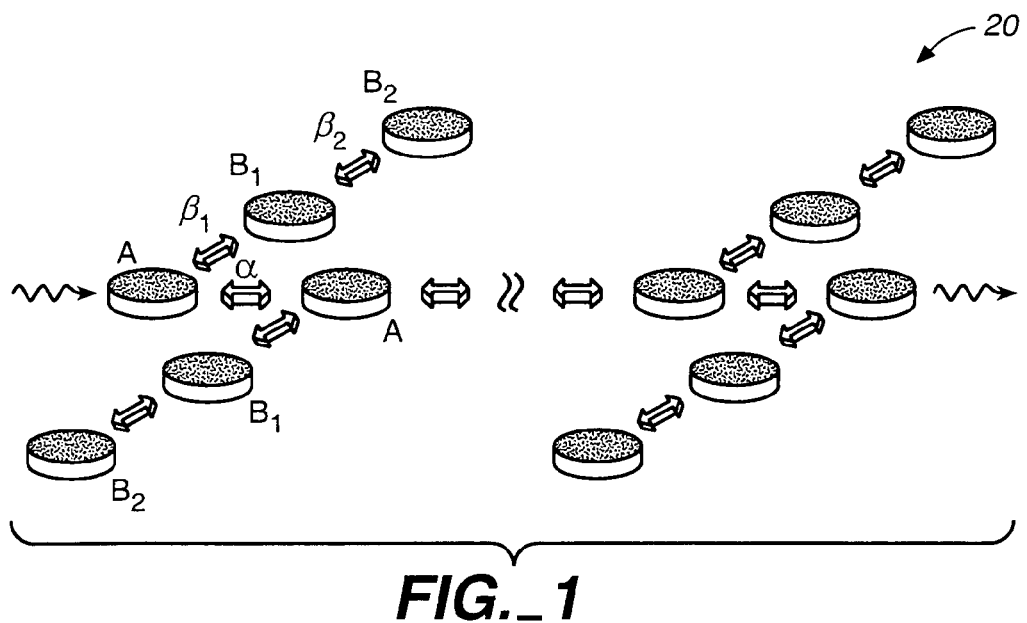
FIG._1
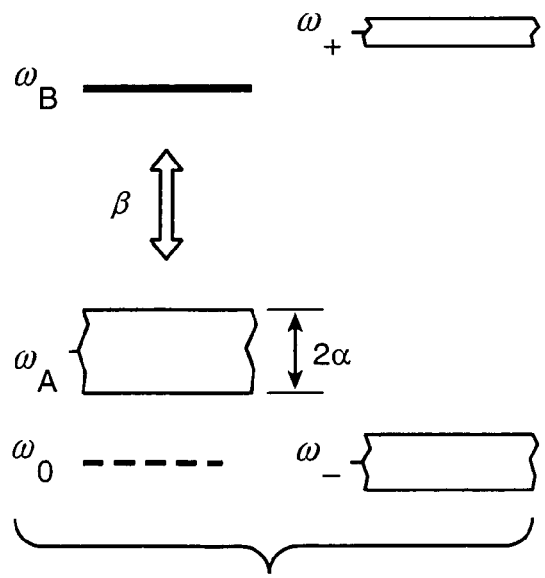
FIG._2a
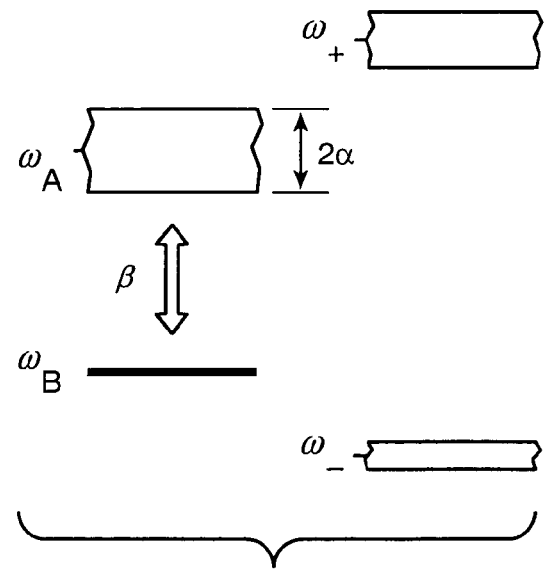
FIG._2b

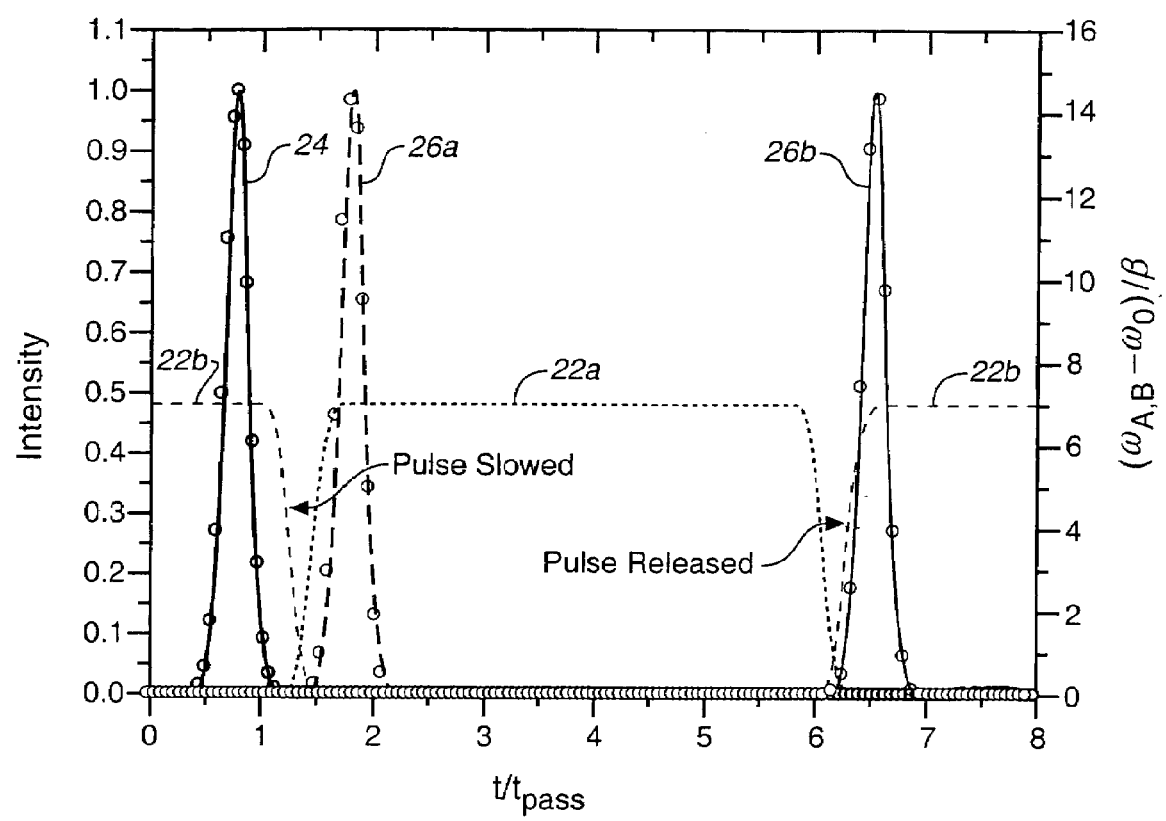
FIG._3a

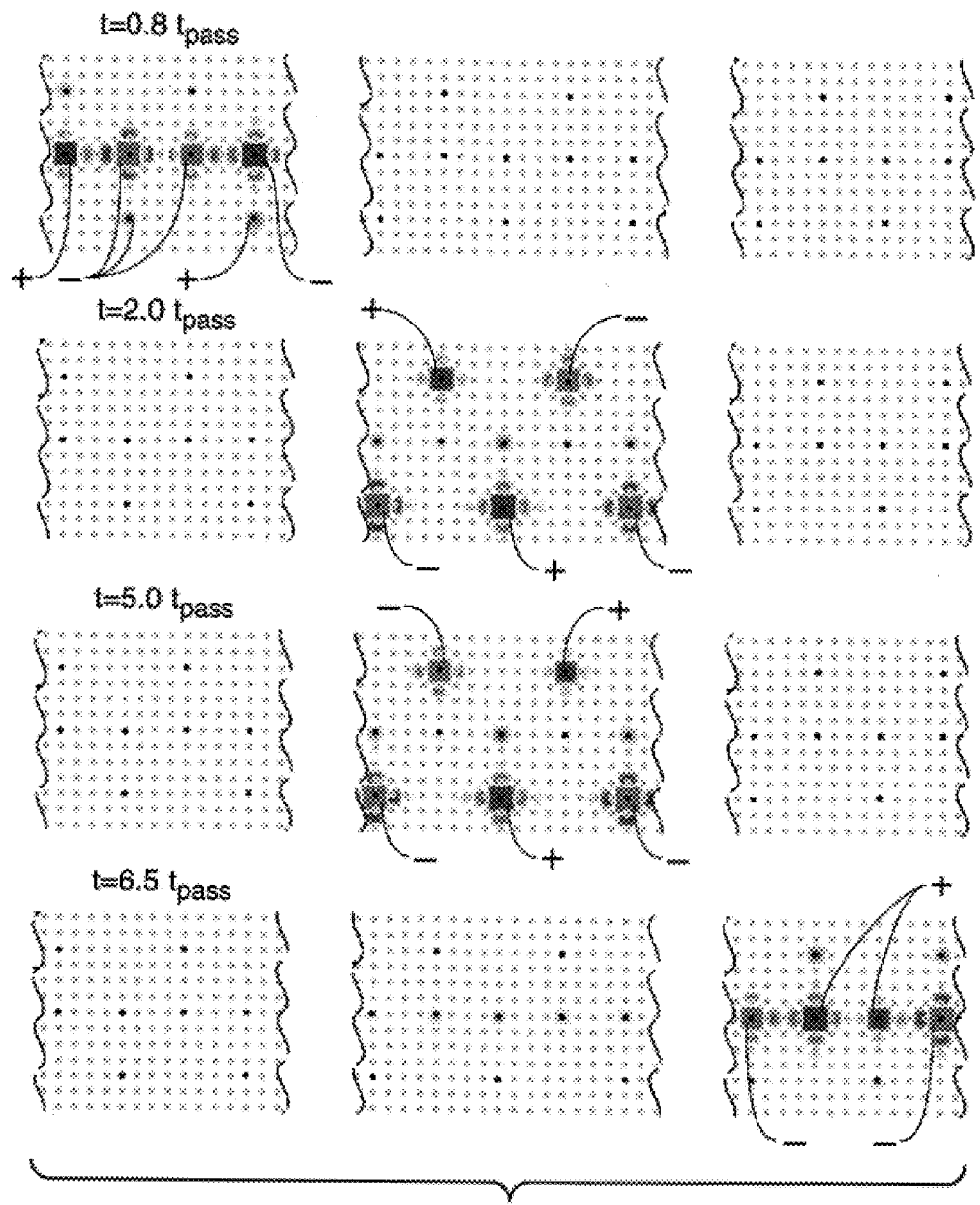
FIG._3b

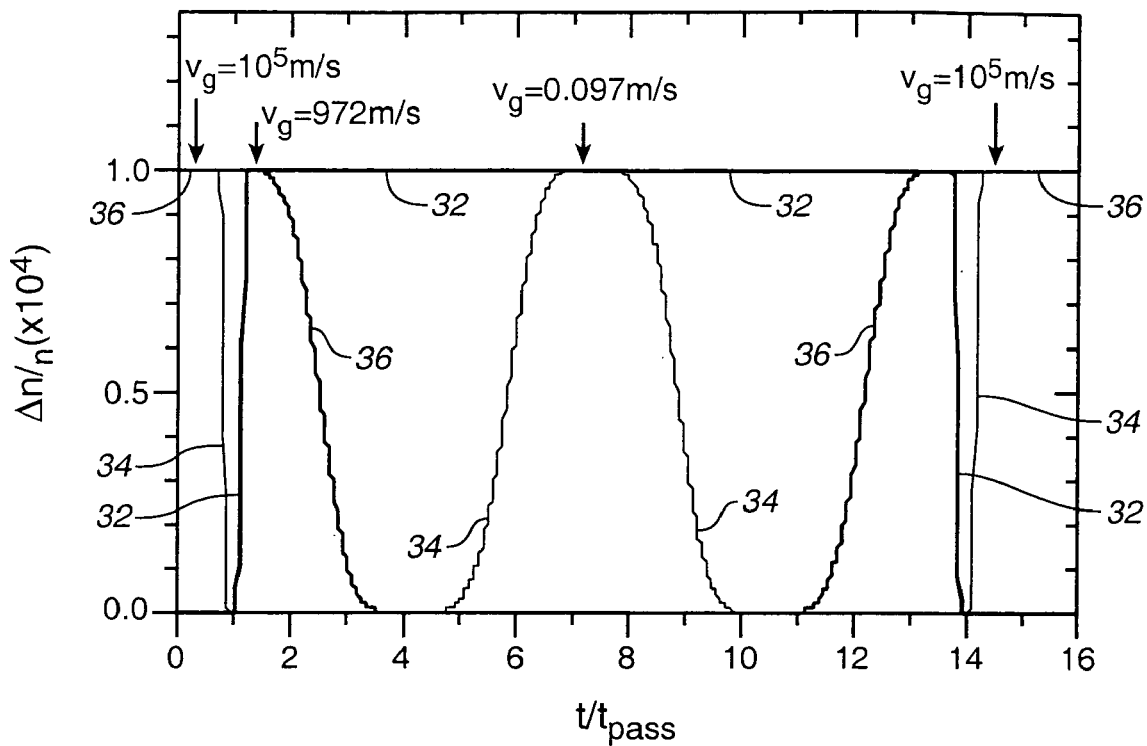
FIG._4a
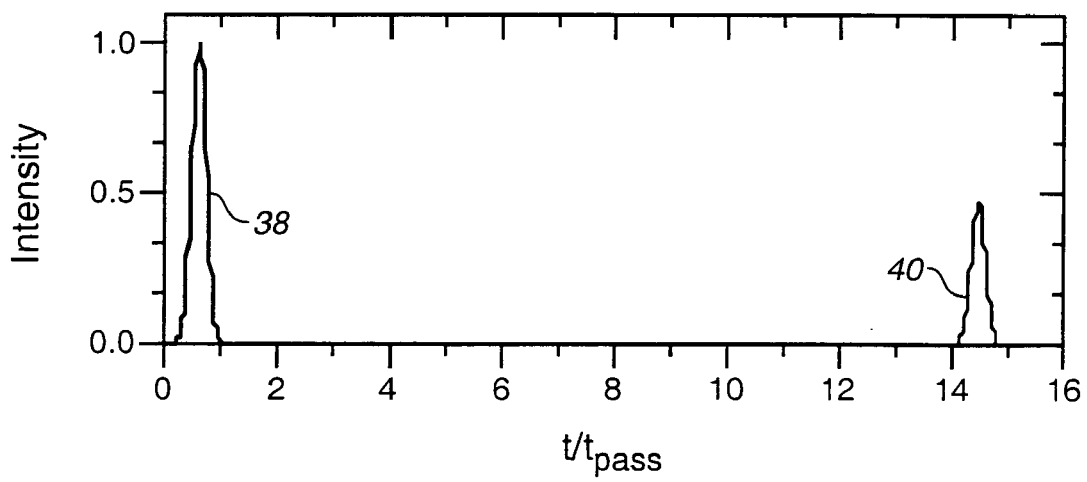
FIG._4b

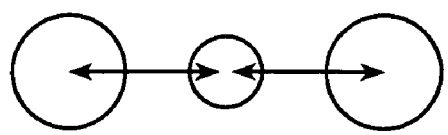
FIG._5a
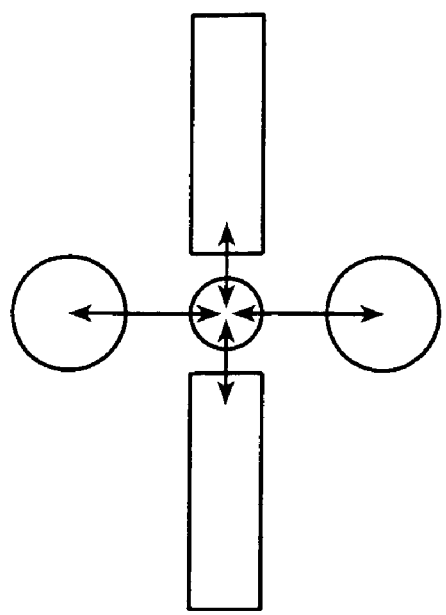
FIG._5b
α → 0
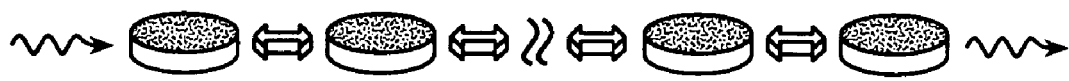
FIG._6a
α → −α
FIG._6b

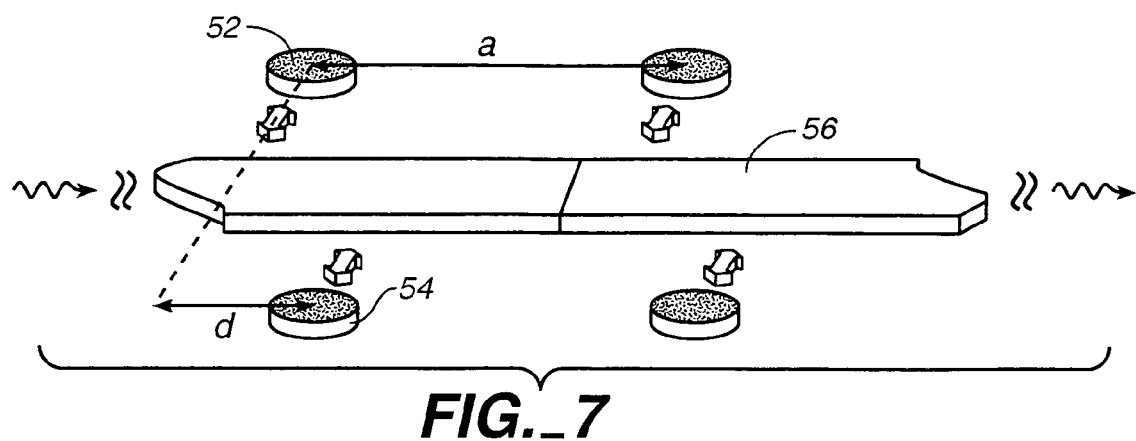
FIG._7
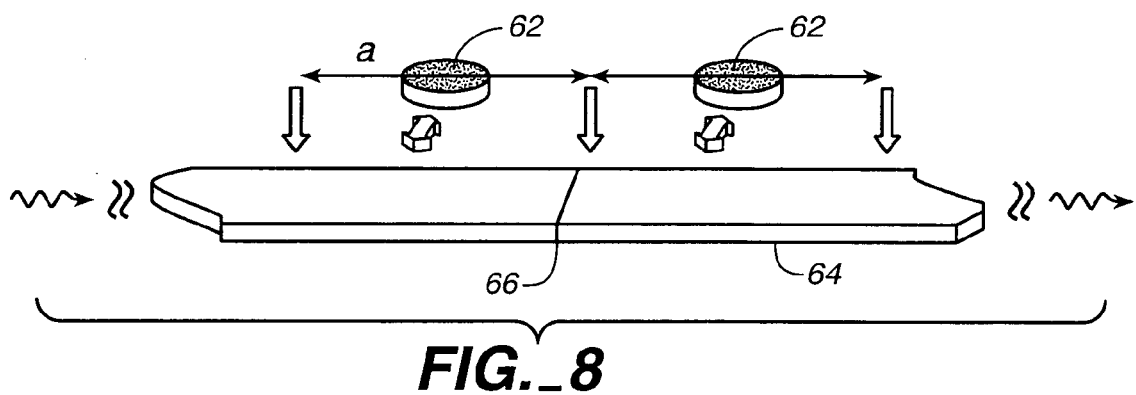
FIG._8
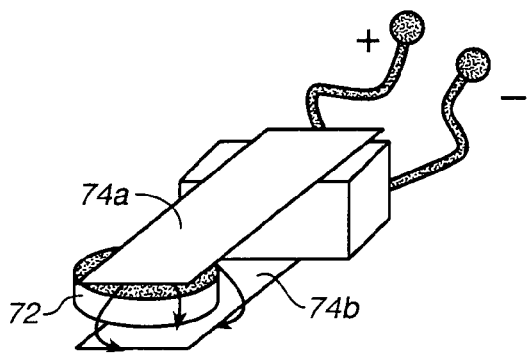
FIG._9a
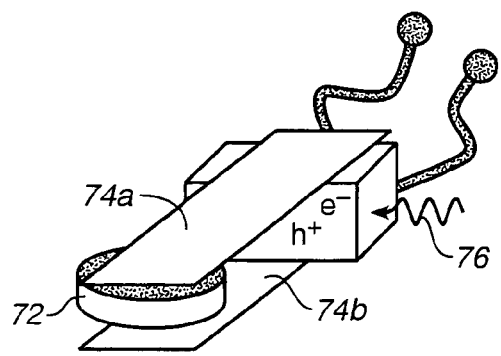
FIG._9b

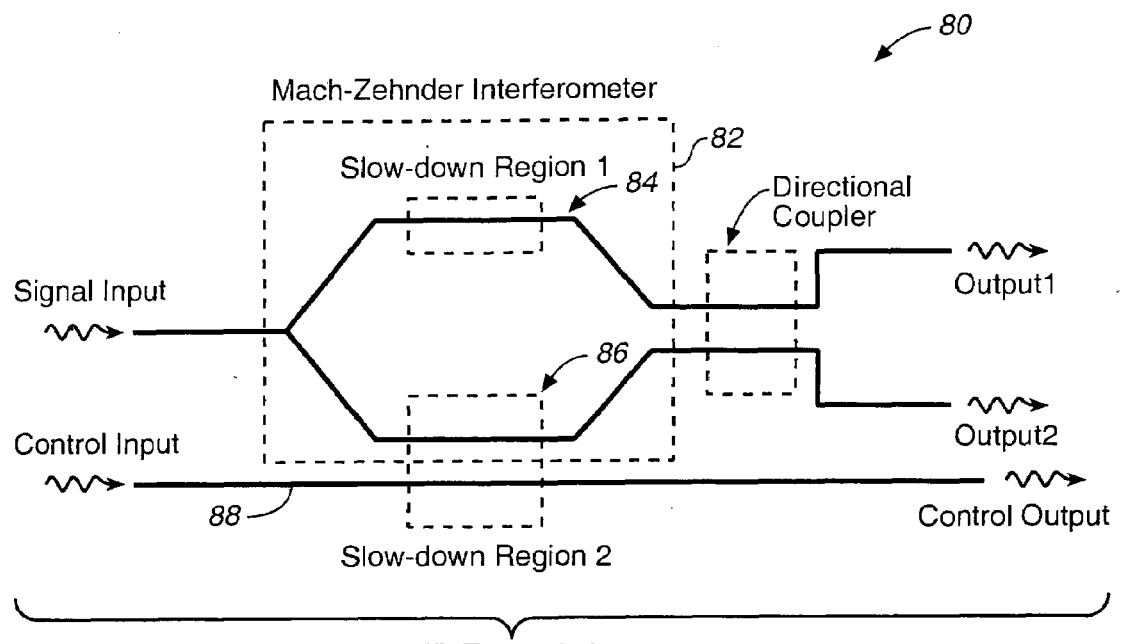
FIG._10
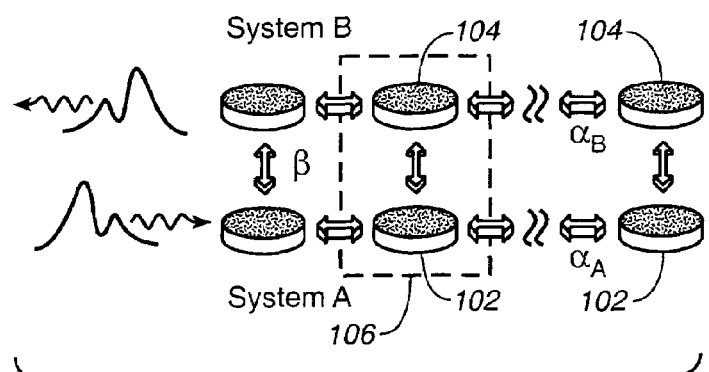
FIG._11

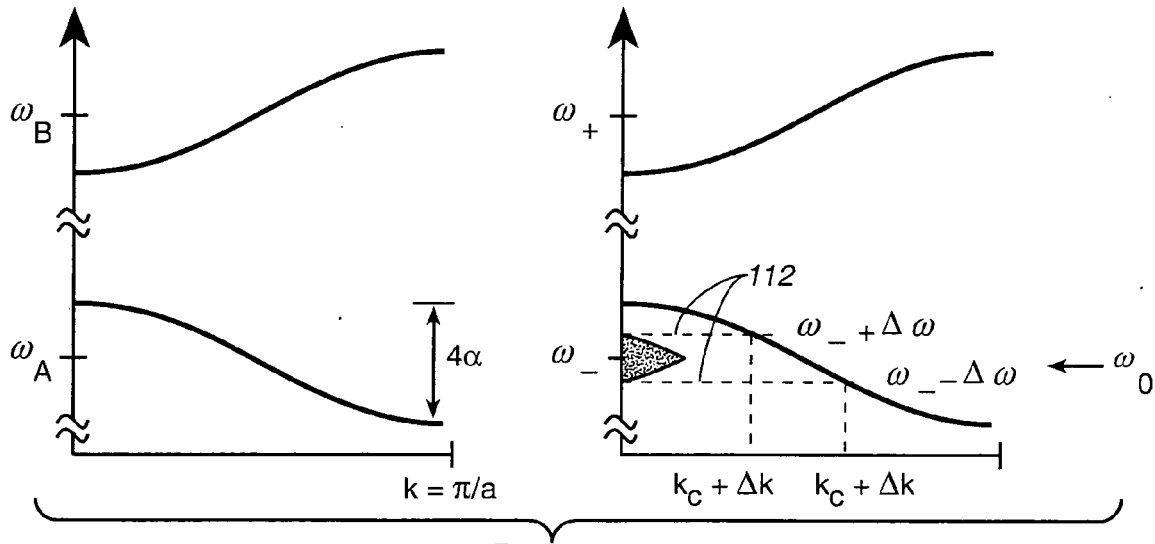
FIG._12a
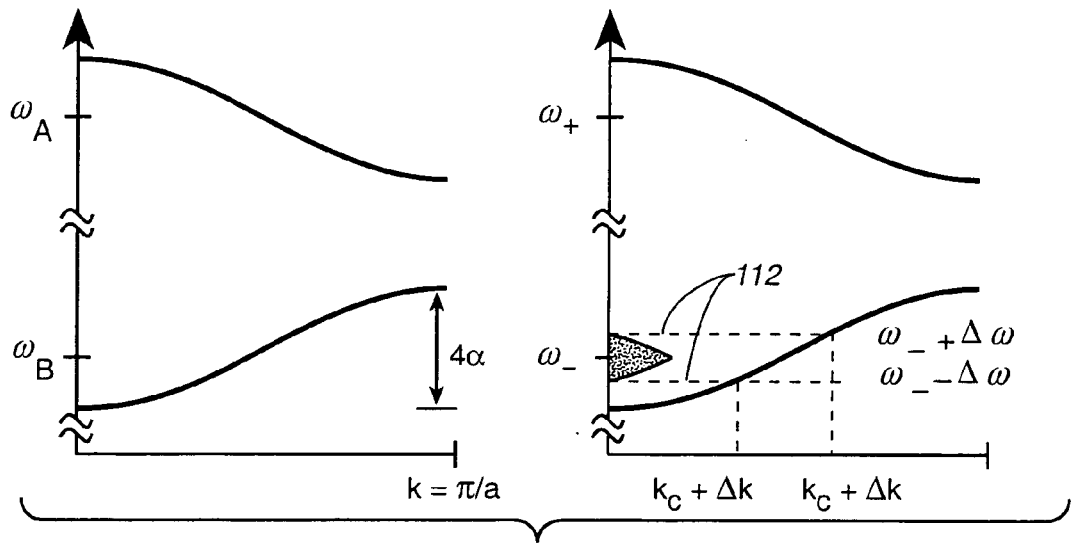
FIG._12b

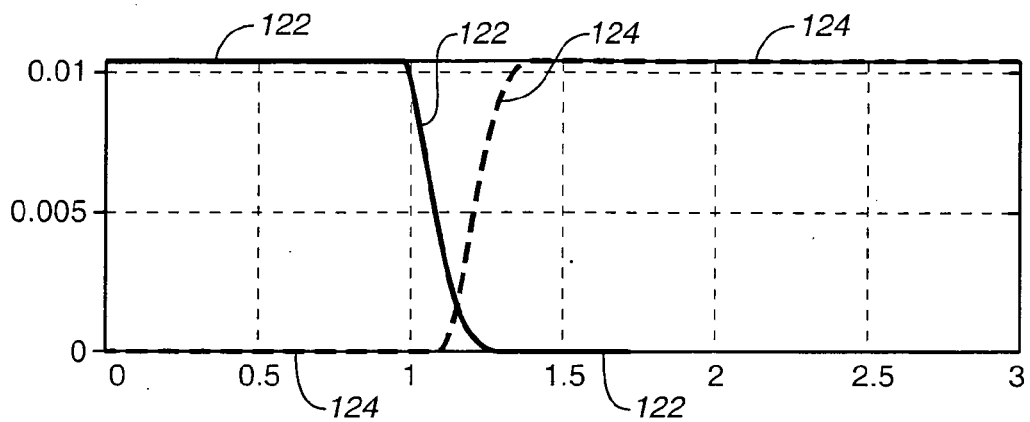
FIG._13a
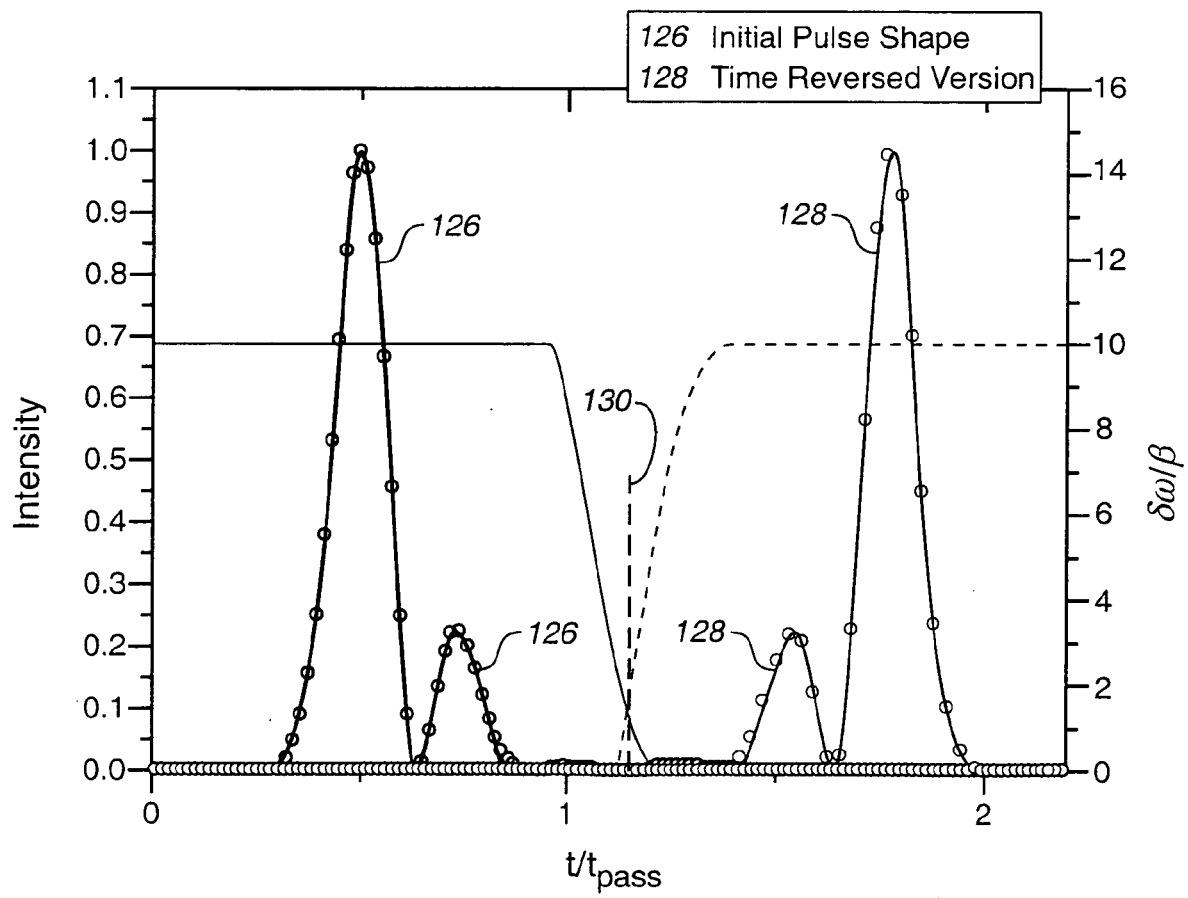
FIG._13b

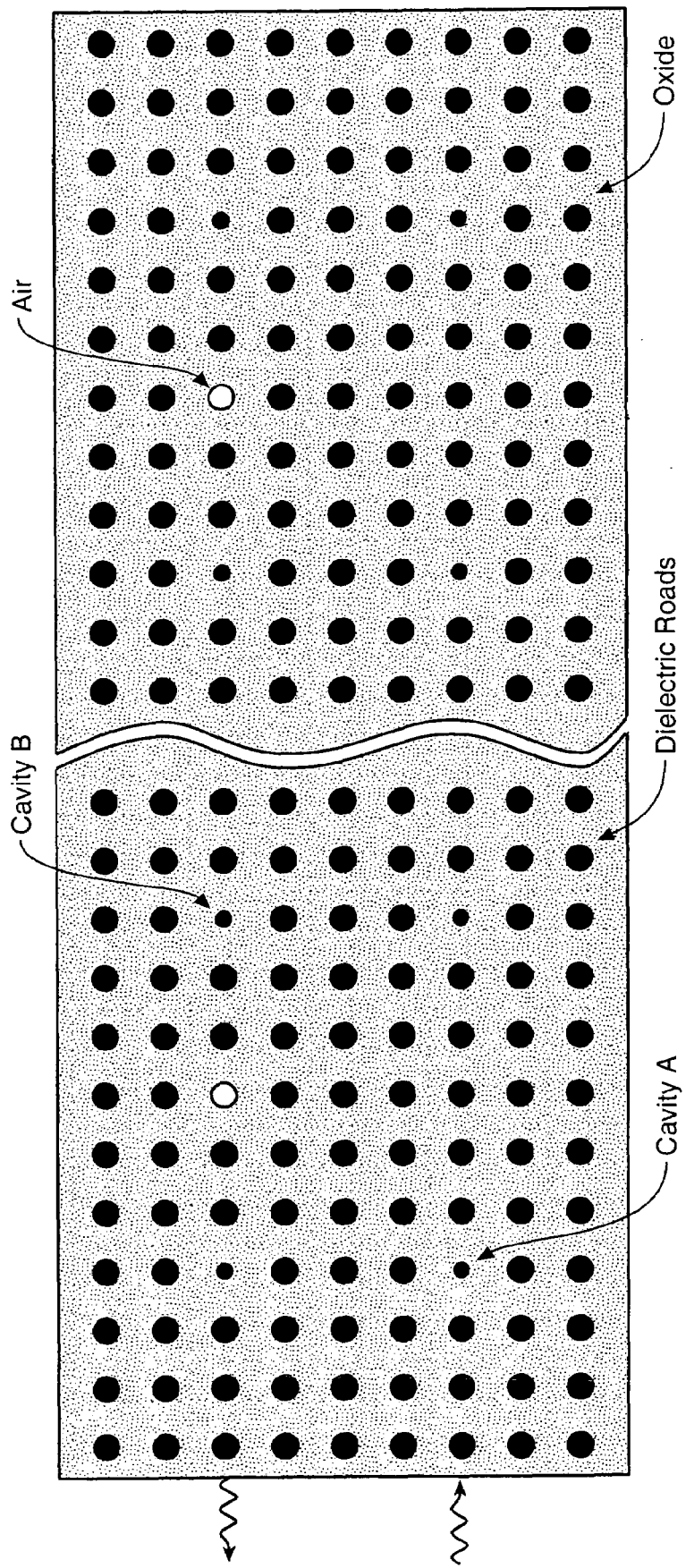
FIG._13c

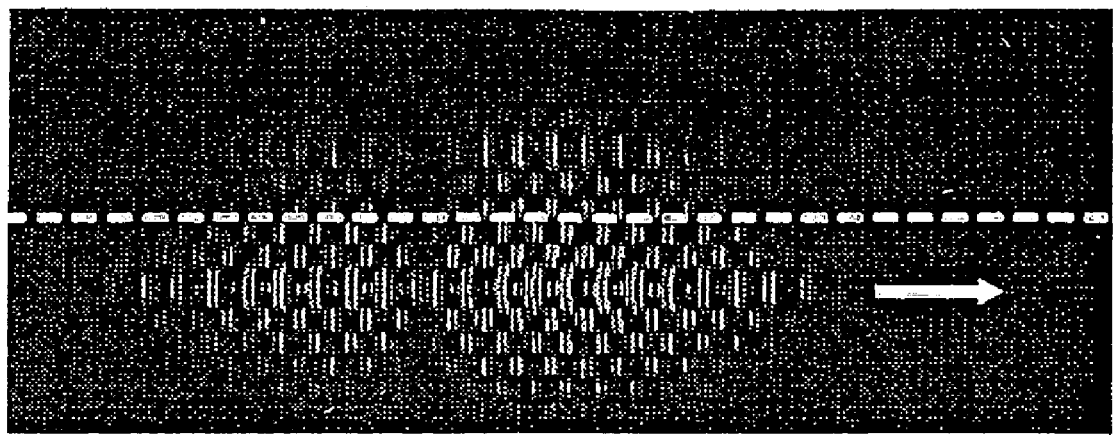
FIG._13d
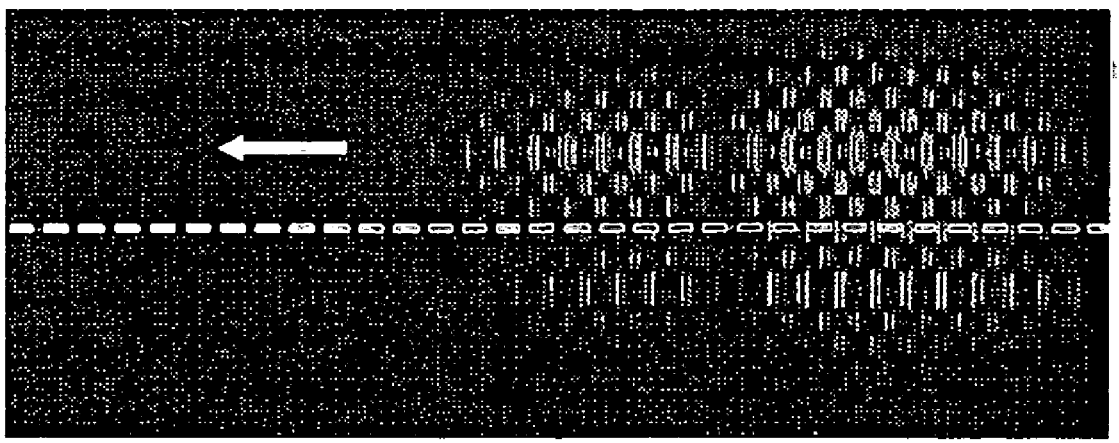
FIG._13e

ULTRA-SLOW DOWN AND STORAGE OF LIGHT PULSES, AND ALTERING OF PULSE SPECTRUM

This invention was made with support from the United States Government under grant number NSF 0200445. The United States Government has rights in this invention.

CROSS-REFERENCE TO RELATED APPLICATION

This application is related to application Ser. No. 11/000,679, filed Nov. 30, 2004, entitled "Stopping and Time Reversing Light in a Waveguide with an All-Optical System," by Mehmet Fatih Yanik, Wonjoo Suh, Zheng Wang and Shanhui Fan. The related application is incorporated by reference in its entirety.

FIELD OF THE INVENTION

This invention relates in general to optical systems, and in particular, to the altering of group velocity and/or spectrum of radiation in optical systems, and to optical systems with field transfer between sub-systems.

BACKGROUND OF THE INVENTION

The ability to drastically slow down the propagation speed of light, and to coherently stop and store optical pulses, holds the key to the ultimate control of light, and has profound implications for optical communications and quantum information processing. See R. Ramaswami, K. N. Sivarajan, *Optical Networks: A Practical Perspective* (Morgan Kaufmann, San Francisco, Calif., 1998)] and M. D. Lukin, A. Imamoglu, *Nature* 413,273 (2001); and L. M. Duan, M. D. Lukin, J. I. Cirac, P. Zoller, *Nature* 414,413 (2001). In order to reduce the group velocity of light coherently, there are two major approaches, which employ either electronic or optical resonances. Using electronic resonances in atomic systems, the group velocity of light can be decreased by several orders of magnitude. See L. Brillouin, *Wave Propagation and Group Velocity* (Academic, New York, 1960). Furthermore, with the use of quantum interference schemes such as the Electromagnetically Induced Transparency (EIT), the absorption at some electronic resonances can be strongly suppressed. See K. J. Boiler, A. Imamoglu, S. E. Harris, *Phys. Rev. Lett.* 66,2593 (1991). Dramatic slow down or even complete stop of light pulses can then be accomplished by converting the optical signal into coherent electronic states. See A. Kasapi, M. Jain, G. Y. Yin, S. E. Harris, *Phys. Rev. Lett.* 74,2447 (1995); L. V. Hau, S. E. Harris, Z. Dutton, C. H. Behroozi, *Nature* 397, 594 (1999); M. M. Kash et. al, *Phys. Rev. Lett.* 82, 5229 (1999); D. Budker, D. F. Kimball, S. M. Rochester, V. V. Yashchuk, *Phys. Rev. Lett.* 83, 1767 (1999); C. Liu, Z. Dutton, C. H. Behroozi, L. V. Hau, *Nature* 409, 490 (2001); D. F. Phillips, A. Fleischhauer, A. Mair, R. L. Walsworth, M. D. Lukin, *Phys. Rev. Lett.* 86, 783 (2001); A. V. Turukhin et. al, *Phys. Rev. Lett.* 88, 236021 (2002); M. S. Bigelow, N. N. Lepeshkin, R. W. Boyd, *Phys. Rev. Lett.* 90,113903 (2003).

The use of electronic states to coherently store the optical information, however, imposes severe constraints on the operating conditions. As a result, only a few very special and delicate electronic resonances available in nature possess all the required properties. All the demonstrated operating bandwidths are far too small to be useful for most purposes. The wavelength ranges where such effects can be observed are also very limited. Furthermore, while promising steps have been taken for room temperature operation in solid-state systems, it still remains a great challenge to implement such schemes on-chip with integrated optoelectronic technologies. See A. V. Turukhin et. al, *Phys. Rev. Lett.* 88, 236021 (2002); and M. S. Bigelow, N. N. Lepeshkin, R. W. Boyd, *Phys. Rev. Lett.* 90,113903 (2003).

Consequently, it is of great interest to pursue the control of light speed using optical resonances in photonic structures including dielectric micro-cavities and photonic crystals. See Y. Yamamoto, R. E. Slusher, *Phys. Today* 46,66 (1993); E. Yablonovitch, *Phys. Rev. Lett.* 58,2059-2062 (1987); S. John, *Phys. Rev. Lett.* 58,2486-2489 (1987); and J. D. Joannopoulos, R. D. Meade, J. N. Winn, *Photonic Crystals: Molding the Flow of Light* (Princeton, N.J., 1995).

Photonic structures can be defined by lithography and designed to operate at any wavelength range of interest. Ultra-high quality-factor cavities have been realized on semiconductor chips, and group velocities as low as $10^{-2}$ c for pulse propagation with negligible distortion have been experimentally observed in photonic crystal waveguide band edges or with Coupled Resonator Optical Waveguides (CROW). See D. K. Armani, T. J. Kippenberg, S. M. Spillane, K. J. Vahala, *Nature* 421, 925 (2003); M. Notomi et. al, *Phys. Rev. Lett.* 87,253902 (2001); See N. Stefanou, A. Modinos, *Phys. Rev. B* 57,12127 (1998); A. Yariv, Y. Xu, R. K. Lee, A. Scherer, *Opt. Lett.* 24, 711-713 (1999); and M. Bayindir, B. Temelkuran, E. Ozbay, *Phys. Rev. Lett.* 84,2140-2143 (2000). Nevertheless, such structures are fundamentally limited by the so-called delay-bandwidth product. See, for example, G. Lenz, B. J. Eggleton, C. K. Madsen, R. E. Slusher, *IEEE Journal of Quantum Electronics* 37, 525 (2001). The group delay from an optical resonance is inversely proportional to the bandwidth within which the delay occurs. Therefore, for a given optical pulse with a certain temporal duration and corresponding frequency bandwidth, the minimum group velocity achievable is limited. In a CROW waveguide structure, for example, the minimum group velocity that can be accomplished for pulses at 10 Gbit/s rate with a wavelength of 1.55 µm is no smaller than $10^{-2}$ c. For this reason, up to now, photonic structures could not be used to stop light.

The capability to reverse a wave in time has profound scientific and technological implications. In the field of acoustics or electronics, where the frequencies of the waves are low, time reversal of pulses can be accomplished through electronic sampling, recording, and playing back. For acoustic waves in particular, such processes has led to the developments of a wide variety of novel applications such as detection through random media, adaptive optics and sub-wavelength focusing. See M. Fink, "Time reversal of Ultrasonic Fields-Part I: Basic Principles", *IEEE Trans. Ultrason., Ferroelec, Freq. Contr.,* 39, 555 (1992); F. Wu, J. Thomas, M. Fink, "Time reversal of Ultrasonic fields-Part II: Experimental Results", *IEEE Trans. Ultrason., Ferroelec, Freq. Contr.,* 39, 567 (1992); I. Freund, "Time-reversal symmetry and image reconstruction through multiple-scattering media", *J. Opt. Soc. Am.* A, 9, 456,1992; and J. de Rosny, M. Fink, "Overcoming the Diffraction Limit in Wave Physics Using a Time-Reversal Mirror and a Novel Acoustic Sink", *Phys. Rev. Lett.* 89,124301 (2002).

The time reversal of an optical pulse is quite important in signal processing, and dispersion compensation in communication systems. Till now all the schemes for time reversal operation required use of special materials and nonlinear processes, which technologically are quite restrictive. A two-dimensional or three-dimensional array of many such structures can have many applications (as special mirrors in free-space communications) or in warfare applications where electromagnetic pulses are used. Other applications include the possibility of making an extremely precise auto-correlator or other signal processing parts.

In the field of optics, it has also been recognized that time-reversal operation can be used to enable complete compensation of both linear and nonlinear pulse dispersions. See D. M. Marom, "Real-Time Spatial-Temporal Signal Processing with Optical nonlinearities", *IEEE Journal of Quantum Elec,* 7, 683 (2001). Since the phase front of optical wave oscillates at a frequency that is far higher than electronic sampling rates, the only mechanisms available for time reversal requires the use of nonlinear optical processes such as near-degenerate four-wave mixing. See D. M. Pepper, "Nonlinear optical phase conjugation", in *Laser. Handbook,* vol. 4. Amsterdam: North-Holland Physics, 1988, pp. 333-485. While degenerate four-wave mixing provides a mechanism for phase-conjugating a monochromatic wave, in order to perform an ideal time-reversal operations for an optical pulse perfect phase-matching in principle need to be satisfied over the entire pulse bandwidth, which presents a challenge to the developments of suitable nonlinear optical materials. In addition, such a process typically requires the use a strong pump laser, which limits the possibility of on-chip integration.

It is therefore desirable to provide improved systems whereby the above described difficulties are alleviated.

SUMMARY OF THE INVENTION

One embodiment of one aspect of the invention is based on the recognition that an optical pulse can be delayed by causing the bandwidth of an optical pulse to be compressed after the pulse has entered the medium so that information in the pulse is substantially preserved, wherein the pulse after the compression is of the same type as the one prior to the compression. This aspect has many applications, including switching. This is applicable to non-optical pulses as well, such as acoustic pulses or other electromagnetic pulses with non-optical frequency components.

In an implementation of an embodiment of the invention, a medium having a bandwidth is provided that can initially accommodate the frequency components of a wave pulse that propagates in the medium along a direction, said medium comprising two or more sub-systems that are substantially translationally invariant along the direction. The characteristics of at least one of the sub-systems is altered so that information in the pulse is substantially preserved and so that there is field transfer between the sub-systems. The pulse is of the same type before and after the altering.

In an embodiment of another aspect of the invention, an optical medium comprises two structures having dispersion characteristics. A device alters the structures so that they have opposite dispersion characteristics after the pulse has entered the medium so that information in the pulse is substantially preserved, and so that the spectrum of the pulse is modulated. In one implementation of the embodiment, the pulse spectrum is modulated so that it is substantially time reversed compared to the spectrum prior to the altering of the resonance frequency or frequencies or the coupling constant(s).

BRIEF DESCRIPTION OF THE DRAWINGS

FIG. 1 is a schematic view of a tunable micro-cavity system used to stop light to illustrate one aspect of the invention.

FIGS. 2a and 2b are schematic views of the frequency bands $\omega_+$ and $\omega_-$ for the system shown in FIG. 1 with a single side-cavity in each unit cell.

FIG. 3a is a graphical plot illustrating the propagation of an optical pulse through a coupled micro-cavity complex in a photonic crystal system as the resonant frequencies of the cavities are varied. FIG. 3b illustrates snapshots of the electric field distributions in the photonic crystal at the indicated times during the propagation of the optical pulse.

FIGS. 4a and 4b are graphical plots illustrating the group velocity reduction of a 1 ns short pulse below 0.1 m/s in the presence of measured losses in integrated microcavities, and the intensity of the incident pulse as recorded in the first waveguide-cavity, and the intensity in the last waveguide-cavity, in the absence and in the presence of group velocity reduction, respectively.

FIG. 5a is a schematic view of a tunneling resonator in the middle controlling energy transfer between two cavities. FIG. 5b is a schematic view of a cross-waveguide architecture used to control coupling between the two cavities via nonlinear refractive index shift induced by a control pulse in the waveguide.

FIG. 6a is a schematic view of a sequence of cavities where the coupling constants $\alpha$ between the cavities are variable. The coupling constants can be reduced everywhere in order to slow down the pulse, and increased to speed up.

FIG. 6b is a schematic view of a sequence of cavities where the sign of the coupling constants is flipped (reversed) in order to time reverse the incident pulse.

FIG. 7 is a schematic view of a stop-light (time-reversal) system that consists of a waveguide, and resonators coupled to the waveguide.

FIG. 8 is a schematic view of a stop-light structure where only a single set of resonators that are side coupled to a waveguide.

FIGS. 9a and 9b are schematic views illustrating a practical method to modulate cavity resonance frequencies by electro-optical modulation.

FIG. 10 is a schematic view of a nonlinear all-optical switch that can enable ultra-low power switching, and possibly reach single-photon level switching threshold.

FIG. 11 is a schematic view of a system that consists of two translationally invariant sub-systems A and B for time reversing an optical pulse to illustrate an embodiment of another aspect of the invention.

FIGS. 12a and 12b are graphical plots illustrating the opposite dispersion characteristics of sub-systems A and B of FIG. 11, before and after modulation of the dispersion characteristics of the sub-systems for time reversing an optical pulse.

FIG. 13a is a graphical plot illustrating a shift in cavity resonance frequencies over a time period as an asymmetric pulse over time generated by exciting a first cavity in sub-system A and causing the sub-system A of FIG. 11 to be in resonance with the pulse frequency while the sub-system B is kept detuned, so that the field is concentrated in the sub-system A.

FIG. 13b is a graphical plot illustrating the asymmetric pulse as it enters the sub-system A and as it exits through the sub-system B, to show the time reversal effect of the system of FIG. 11.

FIG. 13c is a schematic view of a photonic crystal structure that consists of a square lattice of high dielectric constant rods shown as black dots. Sub-system A comprises high dielectric constant rods with reduced radius embedded in low dielectric constant material, where some of the high dielectric constant rods are removed to generate single mode cavities as sub-system B shown in white dots.

FIGS. 13*d* and 13*e* are snap shots of the electric field distributions in the photonic crystal of FIG. 13*c* at t=0.8t$_{pass}$ and t=1.2 t$_{pass}$ respectively. The dimensions of the images along the propagation direction are compressed. The arrows indicate the propagation direction of the pulse, and the dashed lines represent the locations halfway in between sub-systems A and B.

For simplicity in description, identical components are labeled by the same numerals in this application.

DETAILED DESCRIPTION OF THE EMBODIMENTS

Here we introduce a set of criteria to overcome the fundamental limit imposed by the delay-bandwidth product in optics in trying to delay optical pulses. These criteria enable one to generate arbitrarily small group velocities for optical pulses with a given bandwidth, while preserving all the coherent information entirely in the optical domain. We show that these criteria can be achieved in optical resonator systems using only small refractive-index modulations performed at moderate speeds, even in the presence of losses. In addition, since the bandwidth constraints occur in almost all physical systems that use resonance enhancement effects, our approach to overcome such constraints is applicable to a wide range of systems and applications.

In order to coherently stop an optical pulse with a given bandwidth in an all-optical system, the following criteria are preferably satisfied:

(a) The system possesses large tunability in its group velocity. To allow for an optical pulse with a given bandwidth to enter the system, the system possesses an initial state with a sufficiently large bandwidth (i.e. a large group velocity as required by the delay-bandwidth product) in order to accommodate all the spectral components of the pulse. We design a system such that a small refractive-index shift can change the group velocity by many orders of magnitude, and that the group velocity reduction is independent of losses.

(b) The tuning of the system is performed in a manner such that the bandwidth of the pulse is reversibly compressed. Such bandwidth compression is necessary in order to accommodate the pulse as the system bandwidth is reduced. Thus, the tuning process must occur while the pulse is completely in the system, and must be performed in an adiabatic fashion to preserve all the coherent information encoded in the original pulse. See A. Messiah, *Quantum Mechanics* (Interscience, New York, 1963) for a further explanation and definition of the term "adiabatic." In our design, we use a translationally invariant refractive-index modulation to conserve the wavevector information. The modulation accomplishes a coherent frequency conversion process for all spectral components, and reversibly compresses the bandwidth of the incident pulse.

We exhibit these concepts in the system 20 shown in FIG. 1, which comprises a periodic array of coupled cavities, of which only four unit cells are shown in FIG. 1. Each unit cell of the periodic array contains a waveguide-cavity A, which is coupled to the nearest neighbor unit cells to form a coupled resonator optical waveguide, and side-cavities (such as $B_1$ and $B_2$), which couples only to the cavities in the same unit cell. The side-cavities in adjacent unit cells are placed in an alternating geometry in order to prevent coupling between them. The system 20 may include a larger or fewer number of unit cells repeated along the direction of the waveguide, so that system 20 of FIG. 1 has translational symmetry or invariance along the waveguide. Preferably waveguide-cavities A in the periodic array comprises a linear sequence.

FIGS. 2*a* and 2*b* are schematic views of the frequency bands $\omega_+$ and $\omega_-$ for the system shown in FIG. 1 with a single side-cavity B in each unit cell. $\omega_A$ and $\omega_B$ are the resonance frequencies for the waveguide-cavities A and the side-cavities B, and $\beta$ is the coupling constant between them. The widths of the lines represent the widths of the frequency bands. FIG. 2*a* illustrates the case where $\omega_A-\omega_B<<-|\beta|$. The frequency band $\omega_-$ exhibits a large bandwidth centered at the pulse frequency $\omega_0$. FIG. 2*b* illustrates the case $\omega_A-\omega_B>>-|\beta|$. The frequency band $\omega_-$ exhibits a small bandwidth.

For the simple case where only a single side-cavity B exists in each unit cell, the dynamics of the field amplitudes $a_n$, $b_n$ for cavities A and B in the $n^{th}$ unit cell can be expressed using coupled mode theory, as:

$$\frac{da_n}{dt} = i\omega_A a_n + i\alpha(a_{n-1} + a_{n+1}) + i\beta b_n - \gamma_A a_n \quad (1)$$

$$\frac{db_n}{dt} = i\omega_B b_n + i\beta a_n - \gamma_B b_n \quad (2)$$

Here $\alpha$, $\beta$ are the coupling constants between the pairs of cavities A-A and A-B respectively.

$\omega_A$ and $\omega_B$ are the resonance frequencies, and $Y_A$ and $Y_B$ are the loss rates for the cavities A and B respectively.

Since the system has translational symmetry along the waveguide, the frequencies $\omega_{\pm,k}$ for the eigenstates of the system can be related to a wavevector k as $$\omega_{\pm,k} = \frac{1}{2}\left[\omega_{A,k} + \omega_B + i(\gamma_A + \gamma_B) \pm \sqrt{(\omega_{A,k} - \omega_B + i(\gamma_A - \gamma_B))^2 + 4\beta^2}\right] \quad (3)$$

where $\omega_{A,k}=\omega_A+2\alpha\cos(kl)$ represents the frequency band of the waveguide by itself. For concreteness, we focus on the lower band $\omega_{-,k}$ which has a group velocity at the band center of $$V_{g-} = Re\left[\frac{d\omega_{-,k}}{dk}\right]_{k=\pi/2l} = \alpha l Re\left[1 - \frac{\Delta + i(\gamma_A - \gamma_B)}{\sqrt{(\Delta + i(\gamma_A - \gamma_B))^2 + 4\beta^2}}\right] \quad (4)$$

with $\Delta \equiv \omega_A-\omega_B$. When $\Delta<<-|\beta|$, the lower band exhibits a large group velocity ($V_g \approx 2\alpha l$) and a large bandwidth (FIG. 2*a*). When $\Delta>>|\beta|$ (FIG. 2*b*), the group velocity at the band center (and also the bandwidth) is reduced by a ratio of $\beta^2/\Delta^2+(\gamma_A-\gamma_B)^2/(4\Delta^3)$. Importantly, the group velocity becomes independent of loss when $\gamma_A$ and $\gamma_B$ are equal. Also, by increasing the number of side-cavities in each unit cell as shown in FIG. 1, the minimum achievable group velocity at the band center can be further reduced to $$2\alpha l\prod_{i=1}^{r}(\beta_i/\Delta)^2$$

where r is the number of the side-cavities in each unit cell, and $\beta_i$ is the coupling constant between the $(i-1)^{th}$ and $i^{th}$ side-cavities as shown in FIG. 1. Thus, the group velocity can be reduced exponentially with linear increase in system complexity, and significant group velocity tuning can be accomplished with the use of small refractive index variation that changes the resonant frequencies $\omega_A$ and $\omega_B$.

In this system, a pulse can be stopped by the following dynamic process: We start with $\Delta<<|\beta|$, such that the lower band has a large bandwidth. By placing the center of $\omega_{-,k}$ at the pulse carrier frequency $\omega_0$ (FIG. 2a), the lower band can accommodate the entire pulse, with each spectral component of the pulse occupying a unique wavevector. After the pulse is completely in the system, we vary the resonance frequencies until $\Delta>>|\beta|$ (FIG. 2b), at a rate that is slow enough compared with the frequency separation between the lower and the upper bands. (The frequency separation reaches a minimum value of $2|\beta|$ when $\Delta=0$). The modulation of the cavity resonances is performed in a manner that preserves translational symmetry of the system. Therefore, cross talk between different wavevector components of the pulse is prevented during the entire tuning process. Also, the slow modulation rate ensures that each wavevector component of the pulse follows only the lower band $\omega_{-,k}$, with negligible scattering into the upper band $\omega_{+,k}$ (i.e. the system evolves in an adiabatic fashion). Consequently, the pulse bandwidth is reversibly compressed via energy exchange with the modulator, while all the information encoded in the pulse is preserved. We note that, for such frequency compression to occur, the modulation does not need to follow any particular trajectory in time except being adiabatic, and can have a far narrower spectrum than the bandwidth of the incident pulse.

We implement the system presented above in a photonic crystal structure that consists of a square lattice of dielectric rods (n=3.5) with a radius of 0.2a, (a is the lattice constant) embedded in air (n=1) (FIG. 3a). The photonic crystal possesses a band gap for TM modes with electric field parallel to the rod axis. Decreasing the radius of a rod to 0.1a generates a single mode cavity with resonance frequency at $\omega_0=0.3224\cdot(2\pi c/a)$. A single mode cavity can also be generated by increasing rather than decreasing the radius. Coupling between two neighboring cavities A and between the adjacent cavities A and B occur through barriers of three rods (l=4a), with coupling constants of $\alpha=\beta=0.00371\cdot(2\pi c/a)$. The resonant frequencies of the cavities are tuned by refractive index modulation of the cavity rods. FIG. 3a is a graphical plot illustrating the propagation of an optical pulse through a coupled micro-cavity complex in a photonic crystal system of the type described above. The photonic crystal consists of 100 cavity pairs. As the resonant frequencies of the cavities are varied, snapshots of the electric field distributions in the photonic crystal at the indicated times during the propagation of the optical pulse are shown in FIG. 3b. Alternatively, the photonic crystal structure can comprise a substrate material with holes therein, where single mode cavities can be generated by filling selected holes with a material different from that of the substrate, or reducing or increasing the size of selected holes. All of the features described herein in this application, including those below regarding time reversal, are also applicable to such structures.

The pulse is generated by exciting the first cavity, and the excitation reaches its peak at $t=0.8t_{pass}$, where $t_{pass}$ is the traversal time of the pulse through the waveguide by itself. Fragments of the photonic crystal are shown in FIG. 3b. The three fragments in FIG. 3b correspond to cavity pairs 3-6, 56-60, 97-100, shown for four different times. The dots arranged in the array indicate the positions of the dielectric rods. The black dots represent the cavities. The dashed lines 22a and 22b represent the variation of $\omega_A$ and $\omega_B$ as a function of time, respectively. The line 24 is the intensity of the incident pulse as recorded in the first waveguide-cavity. The dashed line 26a and solid line 26b represent the intensity in the last waveguide-cavity, in the absence and in the presence of group velocity reduction, respectively. The group velocity reduction occurs from $1.0t_{pass}$ to $1.5t_{pass}$. The pulse is then held near stationary in the system until $6.0t_{pass}$. Afterwards, the pulse is completely released at $6.5t_{pass}$. Open circles are FDTD results, and the dashed lines are from coupled mode theory. Snapshots of the electric field distributions in the photonic crystal at the indicated times are shown in FIG. 3b. The "+" and "−" signs represent large positive and negative electric fields, respectively.

We simulate the entire process of stopping light for N=100 pairs of cavities with finite-difference-time-domain method, which solves Maxwell's equations without approximation. The waveguide is terminated by introducing a loss rate in the last cavity by an amount equal to the coupling constant $\alpha$, which provides a perfectly absorbing boundary condition for the waveguide mode. The dynamic process for stopping light is shown in FIG. 3a. We generate a Gaussian pulse by exciting the first cavity (The process is in fact independent of the pulse shape one chooses). The excitation reaches its peak at $t=0.8$ $t_{pass}$, where $t_{pass}$ is the traversal time of the pulse through the waveguide by itself. While the pulse is generated, the waveguide is in resonance with the pulse frequency while the side-cavities are kept detuned. Thus, the field is concentrated in the waveguide region (FIG. 3b, t=0.8 $t_{pass}$), and the pulse propagates inside the waveguide at a relatively high group velocity speed of 2 $\alpha l$. After the pulse is generated, we gradually tune the side-cavities into resonance with the pulse while de-tune the waveguide out of resonance. At the end of this process, the field is almost completely transferred from the waveguide to the side-cavities (FIG. 3b, t=2.0 $t_{pass}$), and the group velocity of the pulse at time t=2.0 $t_{pass}$ becomes greatly reduced. Empirically, we have found that the use of a simple modulation ($\exp[-t^2/t^2_{mod}]$) with the rise and fall times of $t_{mod}=10/\beta$ is sufficient to satisfy the adiabatic tuning condition; it will be understood, however, that rise and fall times of $t_{mod}$ of more than about $1/\beta$ may be used and still satisfy the adiabatic constraint and are within the scope of the invention. Although in principle modulation of only either the side-cavities or the waveguide-cavities is necessary, we have modulated both cavities with equal strength to minimize the frequency shift required for a given group velocity reduction. With the waveguide out of resonance, the pulse is held in the side-cavities (FIG. 3b, t=5.0$t_{pass}$), and shows almost no forward motion over the time period of $3t_{pass}$ except phase change. Then, after an arbitrarily selected delay of $5.0t_{pass}$, the pulse is released by the same index modulation process above repeated in reverse, with the side-cavities gradually detuned off resonance while the waveguide tuned into resonance (FIG. 3b, t=6.5$t_{pass}$). The pulse intensity as a function of time in the last cavity of the waveguide is plotted in FIG. 3a, and shows the same temporal shape as both the pulse that propagates through the waveguide by itself, and the initial pulse as recorded in the first cavity of the waveguide.

Thus, our simulation indeed demonstrates that the pulse is perfectly recovered without distortion after the intended delay of $5.0t_{pass}$, and the FDTD simulation agrees very well with the coupled mode theory analysis. In the FDTD simulations, we choose an index modulation of 8% and a modulation rate of 5 GHz to make the total simulation time feasible. The simulation demonstrates a group velocity of $10^{-4}$ c for a 4 ps pulse at 1.55 μm wavelength. Such a group velocity is at least two orders of magnitude smaller than the minimum group velocity achievable for such a pulse in any conventional slow-light structure.

In practical optoelectronic devices, the modulation strength (δ n/n) is typically on the order of $10^{-4}$ at a maximum speed exceeding 10 GHz. See S. L. Chuang, *Physics of Optoelectronic Devices* (Interscience, New York, 1995). Since such modulation strength is far weaker compared with what is used here in the FDTD simulation, the coupled mode theory should apply even more accurately in the realistic situation. Therefore, using coupled mode theory, we have simulated the structure shown in FIG. 1 with two side-cavities coupled to each waveguide-cavity. We use coupling constants of $\beta_1=10^{-5}\ \omega_A$ and $\beta_2=10^{-6}\ \omega_A$, a maximum index shift of δ n/n=$10^{-4}$, and assume a cavity loss rate of $\gamma=4\cdot10^{-7}\ \omega_A$ that has been measured in on-chip microcavity structures. See D. K. Armani, T. J. Kippenberg, S. M. Spillane, K. J. Vahala, *Nature* 421, 925 (2003). A waveguide-cavity coupling constant of $\alpha=10^{-5}\ \omega_A$ is used to accommodate a 1 ns pulse.

FIGS. 4a and 4b are graphical plots illustrating the group velocity reduction of a 1 ns short pulse below 0.1 m/s in the presence of measured losses in integrated microcavities, and the intensity of the incident pulse as recorded in the first waveguide-cavity, and the intensity in the last waveguide-cavity, in the absence and in the presence of group velocity reduction, respectively.

In FIG. 4a, the lines marked 32, 34 and 36 represent the relative changes in the refractive indices of the cavities A, $B_1$ and $B_2$, respectively, as a function of time. In FIG. 4b, the line 38 represents the intensity of the incident pulse as recorded in the first waveguide-cavity. The line 40 represents the intensity in the last waveguide-cavity, in the presence of group velocity reduction, respectively. Here, the bandwidth compression process occurs in two stages, first by transferring the field from the cavities A to $B_1$, and then from the cavities $B_1$ to $B_2$ as shown FIGS. 4a and 4b. At the end of this bandwidth compression and energy transfer processes, the group velocity reduces to below 0.1 meters per second. The same process repeated in reverse recovers the original pulse shape without any distortion in spite of the significant loss present. At such ultra-slow speeds, the pulses stay stationery in the side-cavities and experience negligible forward propagation. The storage times then become limited only by the cavity lifetimes. Importantly, the storage times are also independent of the pulse bandwidths, which enable the use of ultra-high quality-factor microcavities to store short (large bandwidth) pulses coherently, by overcoming the fundamental bandwidth constraints in ultra-high Q cavities. The performance can be further improved by the use of gain mediums in the cavities to counteract the losses. See Y. Xu, Y. Li, R. K. Lee, A. Yariv, *Phys. Rev. E* 62, 7389 (2000).

The required number of the cavities is determined by the bandwidth of the pulse, which sets the maximum speed in the waveguide, and the duration of the modulation during the first stage of the field transfer, which sets the distance that the pulse travels before its speed is reduced. Thus, by using a relatively large coupling between the side-cavities $B_1$, and waveguide-cavities A, a fast slow-down of the pulse is achieved without violating adiabaticity, which reduces the propagation distance of the pulse significantly. For the two-stage system presented above, to accomplish the entire process of slowing down and recovering, a waveguide with a total length of 120 microcavities modulated at a maximum of 1 GHz has been sufficient. Thus chip scale implementation of such systems is foreseeable.

While in the exemplary embodiment presented above, the tuning of the group velocity is accomplished by adjusting the resonant frequencies of cavities; one could equivalently adjust the group velocity by changing the coupling constant between the cavities directly. Thus it is not necessary to have two bands, and only a single band can be modulated by varying coupling constants. This could be achieved, for example, in a CROW waveguide, by adjusting the dielectric constant of the dielectric structures between two cavities. The dielectric structure between the cavities forms a tunneling barrier in which the field decays exponentially. Thus, small modulations in the tunneling barrier (e.g. by changing the dielectric constant or absorption or gain property) can lead to exponential changes in the coupling between the cavities. Both schemes can be achieved by all-optical non-linear processes or by electro-optic modulation, both of which can be applied locally to the cavities only, or to the barriers between the cavities, without also affecting neighboring structures. We also note that our idea can be implemented in fibers, and specifically in photonic crystal fibers, with the resonator systems defined by fiber Bragg gratings. Also, while the proposed structure possesses translational symmetry, we note that such symmetry is not a prerequisite of the proposed effect. Rather, any structure in which a tunable group velocity can be generated can be used. It should be straightforward to extend the proposed mechanisms to other optical resonator geometry, in particular, the micro-ring, micro-disk, or other resonator geometry where the optical confinement comes entirely from total internal reflections or from photonic band gap effects, or from the combination of the two. The mechanisms could also be potentially implemented in metallic resonators structures where the optical confinement is a result of strong reflection at the metal surfaces or plasmon resonances.

The waveguide may comprise an optical fiber, an on-chip dielectric waveguide, a coupled resonator optical waveguide, a metallic waveguide, or transmission lines.

Furthermore, the energy transfer process can be used to transfer energy and coherent information among any two (e.g. optical) systems with different properties, enabling systems with tunable responses.

The applications of our inventions are many. Since the group velocity reduction can be translationally invariant in space, pulse length does not significantly change as the pulse comes to a halt. Multiple pulses can be held simultaneously along such a system, and desired pulses can then be released on demand. This capability might enable controlled entanglement of networks of quantum systems in distant microcavities via photons, thus opening up the possibility of chip scale quantum information processing with photons e.g. similar to that of ion trap experiments. See Schmidt-Kaler, F. et. al. *Nature All*, 408-411 (2003). It also enables flexible communication architectures, for example, by allowing random access to the optical pulses hold in the buffer.

Since the optical pulses can be slowed and stored for long periods of time, it is possible to achieve extremely high all-optical nonlinearities in the side-cavities over the entire bandwidths of pulses. This opens up the possibility of using self-induced bistability to assist transfer between the side and waveguide cavities.

Such high-nonlinearities could also be used to make all-optical switches. Two pulses in the waveguide would interact in a strong way due to slow speed of pulses. Thus one could imagine that a control pulse could modify the transmission of a signal pulse. Slow light phenomena in this architecture could also be used to generate higher frequencies via nonlinear processes.

In addition to the control of group velocity, our proposed scheme for energy exchange between coupled cavities can be used to couple quantum states between different systems. One possible mechanism is depicted in FIGS. 5a and 5b, where modulation of the frequency of the cavity in the middle can be used to control resonant tunneling of photons between the two side cavities. FIG. 5a is a schematic view of a tunneling resonator in the middle controlling energy transfer between two side-cavities. FIG. 5b is a schematic view of a cross-waveguide architecture used to control coupling between the two side-cavities via nonlinear refractive index shift induced by a control pulse in the waveguide. Such schemes could enable controlled entanglement of qubits in the two side-cavities. The frequency of the middle cavity could either be modulated electro-optically, or with a cross waveguide structure as reported in "All Optical Transistor Action with a Bistable Switch in a Photonic Crystal Cross-Waveguide Geometry," by Yanik, M. F., Fan, S., Soljacic M., *Optics Letters*, Vol. 28, pp. 2506-2508 (2003).

The introduced adiabatic bandwidth compression and expansion processes can be used to tune both the frequency and the bandwidth of arbitrary pulses with a given bandwidth in multitude of resonator systems. Our capability to reshape optical pulses' spectrum while the pulses are inside a tunable system enables complex spectral modification processes in integrated devices. For example, we have demonstrated that it is possible to do perfect "time reversal" of an incoming pulse by coupling two coupled-resonator waveguide arrays with opposite dispersion characteristics (the details of time reversal process to be explained in an embodiment below).

This device enables the bandwidth of the stored optical signal to be changed by an amount independent of the speed of storage (modulation) times. Thus it can be used for sensing purposes (chemical or biosensors) with ultra high sensitivity, tunable bandwidth and frequency at operation speeds faster than the sensing bandwidth.

It is possible to make a system that can modulate its bandwidth without any field transfer. An example of such a structure is shown in FIGS. 6a and 6b. FIG. 6a is a schematic view of a sequence (preferably linear sequence) of cavities where the coupling constants α between the cavities are variable. The coupling constants can be reduced between at least some of the cavities in order to slow down the pulse, and increased to speed up. The coupling can also be later increased after they have been reduced to speed up and release the pulse. FIG. 6b is a schematic view of a sequence of cavities where the sign of the coupling constants is flipped (reversed) in order to time reverse the incident pulse, and sends it back.

It is possible to use waveguides instead of coupled resonators in the schemes presented above. FIG. 7 is a schematic view of a stop-light (time-reversal) system that comprises a waveguide, and resonators coupled to the waveguide. The resonators can be any type of resonator (e.g. photonic crystal or ring). Each unit cell contains two resonators 52 and 54 on opposite sides of the waveguide 56 separated in a direction along the waveguide with distance d, which can be changed. For example in FIG. 7, the wave is stopped by modulating the side cavity frequencies. This same system can also do time-reversal operation.

Another stop-light structure using waveguides in FIG. 8, which is a schematic view of a stop-light structure where only a single set of resonators 62 are side coupled to a waveguide 64 (the resonators can be ring resonators, photonic crystal cavities, or any other resonator). There are partial reflectors 66 (no need to be tunable) in the waveguide. This structure is interesting technologically since it requires only one set of resonators to be tuned.

A practical method to modulate cavity resonance frequencies by electro-optical modulation is shown in FIGS. 9a and 9b. FIGS. 9a and 9b are schematic views illustrating a practical method to modulate cavity resonance frequencies by electro-optical modulation. A cavity 72 is subjected to electric fields emerging from a capacitor like configuration 74 of two conductors 74a and 74b, which are oppositely charged. The conducting plates are kept away from the cavity to prevent losses. The fringing field shifts the dielectric constant (and hence the refractive index) of the cavity, and hence shifts its resonance frequency. Alternatively, fringing field also changes the absorption or gain property of optical materials. If the capacitor 74 is discharged controllably, the fringing field decreases, and the dielectric constant or absorption or gain property also changes. This in turn changes the resonance frequencies of cavities or the coupling constant between cavities. The capacitor can be discharged by an external control pulse. As shown in FIG. 9b, the control (e.g., optical) pulse 76, when launched onto the insulating medium (preferentially away from the cavity) between the capacitor plates, creates free carriers in the insulating medium, and hence causes it to become a conductor, and discharge the capacitor plates. This process could occur extremely fast. More generally, the dielectric constant (and hence the refractive index) of the cavity, and the absorption or gain property of optical materials can be altered controllably by the application of an electric or magnetic field, an electromagnetic, gravitational or acoustic wave or mechanical force.

A nonlinear all-optical switch that can enable ultra-low power switching, and possibly reach single-photon level switching threshold is shown in FIG. 10. The switch 80 comprises an interferometer 82 where the interferometer arms 84, 86 are made out of our dynamic slow-light technology that can bring the light pulses to almost a stop. At ultra-low group velocities the non-linear interactions between photons are dramatically enhanced, and the control input can dramatically change the phase of the photons in the lower interferometer arm, and cause the signal to go either Output1 or Output2 depending on the power in the control waveguide 88.

Further explanation of the above features can be found in "Principles of Stopping and Storing Light Coherently," by Mehmet Fatih Yanik, Shanhui Fan, a copy of which is enclosed herewith as an appendix and made part of this application, and also incorporated herein by reference in its entirety.

Time Reversal and Pulse Compression/Expansion

We introduce a new physical process that performs complete time reversal operation on any wave including optical pulses using only linear optics and electro-optic modulators. The introduced process requires no knowledge of the time-dependent phase or amplitude of the light. Thus it does not require any electronic or optical sampling at optical frequencies. In addition, no phase matching condition and nonlinear multi-photon process is required, which greatly broadens the possible choice of material systems. The similarity of this scheme to the stopping light scheme above further indicates the immense potential of dynamic photonic crystals for spectral control and engineering, which may lead to completely unexpected information processing capabilities in any material system where the index can be tuned only slightly ($\delta$ n/n<10$^{-4}$).

The amplitude $\psi(t)$ of an arbitrary electromagnetic pulse can be expressed as $A(t,x) \cdot \cos(\omega_c t - k_c x + \phi_c)$ at any given spatial location, where $A(t)$ is the time dependent information-carrying part of the amplitude. Here, $\cos(\omega_c t - k_c x + \phi_c)$ is the carrier component of the wave with frequency $\omega_c$, wavevector $k_c$ and phase $\phi_c$. The amplitude $A(t,x)$ can be decomposed into its Fourier components as, $$A(t) = \sum_n A_n e^{i\phi_n - ik_n x} e^{i\Delta\omega_n t} + \sum_n A_n^* e^{-(i\phi_n - ik_n x)} e^{-i\Delta\omega_n t}$$

where $A_n$ is the complex amplitude of the n$^{th}$ Fourier component of the wave with frequency $\omega_n$ with frequency detuning $\Delta\omega_n = \omega_n - \omega_c$, wavevector $k_n$ and phase $\phi_n$. Accordingly, the time reversal $A(-t)$ of the original pulse $A(t)$ should have a Fourier decomposition of $$A(-t) = \sum_n A_n e^{i\phi_n - ik_n x} e^{-i\Delta\omega_n t} + \sum_n A_n^* e^{-(i\phi_n - ik_n x)} e^{i\Delta\omega_n t}$$

Thus the time reversal $A(-t)$ can be obtained if every Fourier component with wavevector $k_n$ and amplitude $A_n e^{i\phi_n - ik_n x}$ of $A(t)$ with detuning $\Delta\omega_n$ can be converted completely to a new frequency with detuning $-\Delta\omega_n$. In order to preserve wavevector $k_n$ information, such a scattering process should occur in a translationally invariant manner. This requires that the pulse should be completely inside the system that generates frequency scattering during the entire time-reversal process.

In order to achieve such a process, we consider a system that comprises two translationally invariant sub-systems A and B as indicated in FIG. 11 with disks 102, 104 respectively. Each sub-system alone is a coupled resonator waveguide structure comprising coupled resonators with nearest-neighbor evanescent coupling rates of $\alpha_A$ for sub-system A and $\alpha_B$ for sub-system B. Sub-system A comprises resonators 102 and Sub-system A comprises resonators 104. See N. Stefanou, A. Modinos, *Phys. Rev. B.* 57, 12127 (1998); and A. Yariv, Y. Xu, R. K. Lee, A. Scherer, *Opt. Lett.* 24, 711-713 (1999). The sub-systems are also evanescently coupled to each other with a coupling rate of $\beta$, and the coupling between the sub-systems is also translational invariant.

It should be noted that FIG. 11 also illustrates a system of field transfer between two subsystems without requiring translational invariance, change in group velocity or pulse bandwidth compression. As long as each subsystem comprises at least one electromagnetic, acoustic or optical resonator, and that these two sub-systems are coupled, a device causes the characteristics of at least one of the sub-systems (e.g. refractive index of a resonator) to be altered can induce field transfer between the sub-systems.

FIGS. 12a and 12b are graphical plots illustrating the opposite dispersion characteristics of sub-systems A and B of FIG. 11, before and after modulation of the dispersion characteristics of the sub-systems for time reversing an optical pulse. The sub-systems may each comprise many different structures. Some examples are resonators, such as ones implemented in photonic crystals, or other structures such as dielectric gratings. This opposite dispersion characteristic can be obtained by designing coupling factors $\alpha$ (FIG. 11) that are equal in magnitude but opposite in sign ($\alpha_A = -\alpha_B$). The dashed box 106 in FIG. 11 indicates a translationally invariant unit cell of the entire system. The dynamics of the field amplitudes $a_n$, $b_n$ for cavities A and B in the i$^{th}$ unit cell can be expressed using coupled mode theory, $$\frac{da_i}{dt} = i\omega_A a_i + i\alpha_A(a_{i-1} + a_{i+1}) + i\beta b_i - \gamma_A a_i \quad (1)$$

$$\frac{db_i}{dt} = i\omega_B b_i + i\alpha_B(b_{i-1} + b_{i+1}) i\beta a_i - \gamma_B b_i \quad (2)$$

Here $\alpha_A$, $\alpha_B$ are the coupling constants between the pairs of cavities 102 in sub-system A, and between the pairs of cavities 104 in sub-system B respectively; $\beta$ is the coupling constant between the pairs of cavities 102-104 between the sub-systems. $\omega_A$ and $\omega_B$ are the resonance frequencies, and $\gamma_A$ and $\gamma_B$ are the loss rates for the cavities A and B respectively.

Since the system has translational symmetry along the waveguide, the frequencies $\omega_{\pm,k}$ for the eigenstates of the system can be related to a wavevector k as $$\omega_{\pm,k} = \frac{1}{2}\left[\omega_{A,k} + \omega_{B,k} + i(\gamma_A + \gamma_B) \pm \sqrt{(\omega_{A,k} - \omega_{B,k} + i(\gamma_A - \gamma_B))^2 + 4\beta^2}\right] \quad (3)$$

where $\omega_{A,k} = \omega_A + 2\alpha_A \cos(kl)$ and $\omega_{B,k} = \omega_B + 2\alpha_B \cos(kl)$ are the frequency bands of the sub-systems A and B respectively when the sub-systems are not coupled to each other ($\beta = 0$). The shapes of the bands become independent of losses when $\gamma_A$ and $\gamma_B$ are equal, which can be adjusted externally.

In this system, a pulse can be time-reversed by the following dynamic process: We start with $\omega_A - \omega_B << -|\beta|$, such that the lower band exhibits the characteristic band shape of the sub-system A as shown in FIG. 12a. By placing the center of $\omega_{-,k}$ at the pulse carrier frequency $\omega_0$, the lower band can accommodate the entire pulse, with each spectral component of the pulse occupying a unique wavevector. After the pulse is completely in the system, we vary the resonance frequencies until $\omega_A - \omega_B >> |\beta|$ (FIG. 2b), at a rate that is slow enough compared with the frequency separation between the lower and the upper bands. (The frequency separation reaches a minimum value of $4|\beta|$ when $\omega_A = \omega_B$). The modulation of the cavity resonances preserves translational symmetry of the system. Therefore, cross talk between different wavevector components of the pulse is prevented during the entire tuning process as indicated by the dashed lines 112 in FIGS. 12a and 12b. Also, the slow modulation rate ensures that each wavevector component of the pulse follows only the lower band $\omega_{-,k}$, with negligible scattering into the upper band $\omega_{+,k}$ (i.e. the system evolves in an adiabatic fashion). Consequently, an initial state with a wavevector $k_n$ and with frequency detuning $\Delta\omega_n$ evolves into a final state with the same wavevector but with the opposite detuning of $-\Delta\omega_n$ via energy exchange with the modulator. The spectrum of the incident pulse is thus modulated (e.g. inverted) while all the information encoded in the pulse is preserved. Such a spectral inversion process can generate a time-reversed version of the pulse from the original pulse, which moves in sub-system B backward to its original propagation direction, and exits the system (FIG.

11). We note that, for such spectral inversion process to occur, the modulation does not need to follow any particular trajectory in time except being adiabatic, and can have a far narrower spectrum than the bandwidth of the incident pulse. Instead of tuning the system by altering the resonance frequency of the resonators to alter the pulse spectrum, it is also possible to achieve the same result by altering the coupling constant between the resonators.

FIG. 13c is a schematic view of a photonic crystal structure that comprises a square lattice of high dielectric constant rods shown as black dots. Sub-system A comprises high dielectric constant rods with reduced radius embedded in low dielectric constant material, where some of the high dielectric constant rods are removed to generate single mode cavities as sub-system B shown in white dots. In one implementation, we implement the system presented above in a photonic crystal structure that comprises a square lattice of high dielectric constant rods (n=3.5) with a radius of 0.2a, (a is the lattice constant) embedded in low dielectric constant material (n=1.5) as illustrated in FIG. 13c. The photonic crystal possesses a band gap for TM modes with electric field parallel to the rod axis. Removing one of the high dielectric constant rods with the low dielectric constant background material, leaving an air hole, generates a single mode cavity with resonance frequency at $\omega_0=0.286\cdot(2\pi c/a)$ as shown in FIG. 13c with black dots. Coupling between two neighboring cavities of the sub-system A occur through a barrier of five rods (l=6a), with a coupling rate of $\alpha_A=1.89\cdot10^{-3}\cdot(2\pi c/a)$. In order to achieve the opposite dispersion characteristic in the sub-system B with respect to that in the sub-system A (i.e. $\alpha_B \simeq -\alpha_A$), we completely replace the high-dielectric constant rods (of the type with reduced diameter in sub-system A) in the low-dielectric constant material with air leaving cavities with radius 0.5a in the middle of the barriers in the sub-system B. In analogy to resonant tunneling diodes, this increases the resonance frequency of the defect in the barrier such that both the sign of the evanescent coupling factor flips and its magnitude is set. The resonant frequencies of the cavities can be tuned by refractive index modulations of the dielectric materials within the cavities in the manner described above for delaying light, such as the description in reference to FIGS. 9a and 9b.

We simulate the entire process of time reversal of light for N=100 pairs of cavities with finite-difference-time-domain method, which solves Maxwell's equations without approximation. The sub-systems are terminated by introducing a loss rate in the last cavities of the sub-systems by an amount equal to absolute value of the coupling constants $|\alpha_{A,B}|$. This provides perfectly absorbing boundary conditions for the waveguide modes of the sub-systems. The dynamic process for time reversal is shown in FIG. 13a. FIG. 13a is a graphical plot illustrating a shift in cavity resonance frequencies over a time period as an asymmetric pulse over time generated by exciting a first cavity in sub-system A and causing the sub-system A of FIG. 11 to be in resonance with the pulse frequency while the sub-system B is kept detuned, so that the field is concentrated in the sub-system A. FIG. 13b is a graphical plot illustrating the asymmetric pulse as it enters the sub-system A and as it exits through the sub-system B, to show the time reversal effect of the system of FIG. 11.

Thus, initially, we generate an asymmetric pulse in time as shown in FIG. 13b by exciting the first cavity. The process is in fact independent of the pulse shape one chooses. The excitation 126 reaches its peak at $t=0.5\cdot t_{pass}$ as shown in FIG. 13b, where $t_{pass}$ is the traversal time of the pulse through the system. While the pulse is generated, the sub-system A is in resonance with the pulse frequency while the sub-system B is kept detuned. Thus, the field is concentrated in the sub-system A as shown in FIG. 13c, and the pulse propagates inside the waveguide at a group velocity of $2\alpha_A$ l. After the pulse is generated, we gradually tune the sub-system B into resonance with the pulse while de-tune the sub-system A out of resonance (FIG. 13a, $t=1.2\cdot t_{pass}$). The modulation process is shown in curve 122 and 124 in FIG. 13a. At the end of this process, the field is almost completely transferred from the sub-system A to the sub-system B as shown in FIGS. 13d and 13e.

Empirically, we have found that the use of a simple modulation ($\exp[-t^2/t^2_{mod}]$) with the rise and fall times of $t_{mod}=10/\beta$, is sufficient to satisfy the adiabatic tuning condition; it will be understood, however, that rise and fall times of $t_{mod}$ of more than $1/\beta$ may be used and are within the scope of the invention. Modulation at a speed slower than the frequency difference between the frequency bands of the system may also be used. The modulation bandwidth can therefore be less than that of the pulse. The pulse intensity 128 as a function of time at the exit of the sub-system B shows the perfect time-reversed temporal shape of the initial pulse 126 at the entrance of the sub-system A as plotted in FIG. 13b, where dotted line 130 marks the separation between the two pulses 126 and 128. Thus, our simulation indeed demonstrates that the pulse is perfectly time-reversed without distortion, and the FDTD simulation agrees very well with the coupled-mode theory analysis shown in the same figure. In the FDTD simulations, to make the total simulation time feasible, we choose an index modulation of about 6% and a modulation rise time of about 0.1 ns. In practical optoelectronic devices the modulation strength ($\delta_n/n$) is typically on the order of $10^{-4}$ at a maximum speed exceeding 10 GHz. See S. L. Chuang, *Physics of Optoelectronic Devices* (Interscience, New York, 1995). Since such modulation strength is far weaker compared with what is used here in the FDTD simulation, the coupled-mode theory applies even more accurately in the realistic situation, and shows that complete time reversal process can in fact be achieved even with the small index modulations achievable in practice. See M. F. Yanik, S. Fan, *Phys. Rev. Lett.* 92, 083901 (2004).

The required number of the cavities is determined by the pulse length and by the duration of the time-reversal process, which sets the distance that the pulse travels before its speed is reduced. Thus, by using a relatively large coupling β between the sub-systems B and A, a fast time-reversal of the pulse is achieved without violating adiabaticity, which reduces the propagation distance of the pulse rapidly before it can pass through the system. To accomplish the entire process of time reversal, a total length of about 100 microcavities modulated at a maximum rise time of only 1 ns has been sufficient. Thus chip scale implementation of such systems is foreseeable. The underlying ideas, and presented scheme here are applicable to all wave phenomena, including acoustics and microwave signals. The general scheme we presented here, and the particular implementation in FIG. 12 enables complete spectral reshaping and can be used not only to time-reverse light pulses but also to compress or to expand them both spatially and temporally, and even to stop and store them. See M. F. Yanik, S. Fan, *Phys. Rev. Lett.* 92, 083901 (2004).

Further applications of the above described structures are possible in any wave phenomena including acoustics (sound waves etc.), other types of electromagnetic radiation pulses, fluidics, microwave circuits, and may be gravitation where waves can be delayed, stored, and manipulated. Depending on phenomena, either resonator detuning or resonator couplings can be adjusted by different mechanisms, like mechanical force (using Micro-Electro-Mechanical Systems etc.), optical or electromagnetic or even sound waves. We also can achieve the entire scheme by modulating different parts of the system instead of the high-Q cavities, and the metallic contacts do not need to be in too close proximity to the modulated region.

While the invention has been described above by reference to various embodiments, it will be understood that changes and modifications may be made without departing from the scope of the invention, which is to be defined only by the appended claims and their equivalents. All references referred to herein are incorporated by reference herein in their entireties.

It is claimed:

1. A system for delaying a wave pulse of a type, said wave pulse having frequency components, comprising:
a medium having a frequency bandwidth that can initially accommodate the frequency components of the wave pulse at a group velocity; and
a device causing the frequency bandwidth of the wave pulse to be compressed after the wave pulse has entered the medium so that information in the wave pulse is substantially preserved, wherein the wave pulse is of said type before and after the compression, and the group velocity of the wave pulse is reduced by the compression.

2. The system of claim 1, wherein the device also causes the frequency bandwidth of the wave pulse to be decompressed subsequent to the delaying so as to cause the wave pulse to propagate through the medium at a group velocity greater than the reduced group velocity and so that information in the wave pulse is substantially preserved.

3. The system of claim 1, wherein the wave pulse is an electromagnetic pulse.

4. The system of claim 3, wherein the frequency bandwidth of the medium contains an optical frequency range.

5. The system of claim 1, wherein the medium comprises a first linear sequence of resonators.

6. The system of claim 5, wherein said resonators include dielectric microresonators, and photonic crystal microcavities.

7. The system of claim 5, the device causing the frequency bandwidth of the wave pulse to be compressed by altering a coupling constant of the coupling between adjacent resonators.

8. The system of claim 7, further comprising at least one additional resonator between each two resonators in the said first linear sequence wherein the coupling constant is altered by placing at least one additional resonator between each two resonators in the said first linear sequence, and by adjusting the resonant frequency of the additional resonators, or adjusting the resonant frequency of the resonators in the first sequence, or by adjusting the loss characteristics of the additional resonators.

9. The system of claim 8, said wave pulse propagating along a direction in the medium, said medium being substantially translationally invariant along said direction.

10. The system of claim 9, said device altering a coupling constant of the coupling between adjacent resonators without substantially altering the translational invariance of the medium.

11. The system of claim 5, the medium further comprising a waveguide.

12. The system of claim 11, said waveguide including an optical fiber, or on-chip dielectric waveguide, or metallic waveguide, or transmission lines.

13. The system of claim 11, each resonator in the first sequence side coupled to the waveguide, the medium further comprising partial reflectors in the waveguide.

14. The system of claim 13, the device causing the frequency bandwidth of the medium to be compressed by altering a resonance frequency of the resonators in the first sequence.

15. The system of claim 11, said wave pulse propagating along the waveguide, wherein each resonator in the first sequence and a corresponding portion of the waveguide form a unit, the units formed by the first sequence and the waveguide being substantially the same so that the medium is substantially translationally invariant along a direction of propagation of the wave pulse.

16. The system of claim 5, said medium comprising an optical material, said resonators comprising cavities in the material, wherein the device causes an index of refraction or absorption or gain property of the material at the cavities to change.

17. The system of claim 5, said wave pulse propagating along the first sequence, wherein the resonators in the first sequence are substantially equally spaced so that the medium is substantially translationally invariant along a direction of propagation of the wave pulse.

18. The system of claim 17, said subsystem including at least one first sequence of resonators.

19. The system of claim 18, the device causing the frequency bandwidth of the wave pulse to be compressed by altering resonance frequencies or loss of the resonators, or by altering the propagating characteristics of the waveguide.

20. The system of claim 18, said wave pulse propagating along the waveguide, wherein each resonator together with a portion of the waveguide form a unit, the units being substantially the same so that the medium is substantially translationally invariant along a direction of propagation of the wave pulse.

21. The system of claim 18, said subsystem comprising at least one additional sequence of resonators, each resonator in the at least one additional sequence being side coupled to a corresponding resonator in the first sequence.

22. The system of claim 21, wherein the waveguide can initially accommodate the frequency components of the wave pulse, the additional sequence has a frequency bandwidth smaller than a frequency range spanned by the frequencies of the frequency components of the wave pulse, the first sequence and the additional sequences having different frequency bandwidths.

23. The system of claim 22, wherein the device causes the frequency bandwidth of the medium to resemble that of the waveguide, and to resemble that of the additional sequence after the wave pulse has entered the medium.

24. The system of claim 18, said waveguide including an optical fiber, or on-chip dielectric waveguide, or coupled resonator optical waveguide, or metallic waveguide, or transmission lines.

25. The system of claim 1, said medium comprising a waveguide and at least one subsystem coupled to the waveguide.

26. The system of claim 1, said medium comprising an optical material, the device causing the frequency bandwidth of the medium to be compressed by causing dielectric constant, or absorption property or gain property, of the material to change.

27. The system of claim 26, the device causing the dielectric constant, or absorption property or gain property, of the material to change by applying to it an electric or magnetic field, an electromagnetic, or acoustic wave or mechanical or gravitational force.

28. The system of claim 1, said wave pulse propagating along a direction in the medium, said medium being substantially translationally invariant along said direction.

29. The system of claim 28, said device causing the frequency bandwidth of the medium to be compressed without substantially altering the translational invariance of the medium.

30. The system of claim 1, said medium comprising a material with a periodic arrangement of resonators therein.

31. The system of claim 1, said medium comprising a photonic crystal with a substantially periodic arrangement of defects therein.

32. The system of claim 31, said defects comprising reduced or increased diameter rods among an arrangement of rods in the crystal, or reduced or increased diameter cavities in a material among an arrangement of cavities.

33. The system of claim 32, wherein the device modulates the index of refraction or absorption or gain property of the reduced diameter rods or reduced diameter cavities in the crystal.

34. The system of claim 31, said medium comprising a substrate of a material, said defects comprising cavities containing a material different from that of the substrate.

35. The system of claim 1, wherein the device modulates the frequency bandwidth of the medium adiabatically.

36. The system of claim 35, wherein the medium comprises a waveguide and resonators coupled to the waveguide with a coupling constant $\beta$, and modulation applied by the device has a rise time of greater than about $1/\beta$.

37. The system of claim 1, said device comprising pairs of conductive members with electric charges thereon for applying electric fields to the medium, each of at least some of the pairs being connected by an insulating material, said device further comprising a source controllably supplying electromagnetic radiation to the material, causing the electric charges on said at least some of the pairs to be discharged, for altering the refractive index, or absorption or gain property, of the medium.

38. The system of claim 1, said medium and said device being such that the wave pulse is stored in the medium.

39. The system of claim 1, said medium and said device being such that passage of the wave pulse through the medium is substantially stopped.

40. A method for delaying a wave pulse of a type, said wave pulse having frequency components, comprising:
providing a medium having a frequency bandwidth that can initially accommodate the frequency components of the wave pulse at a group velocity; and
causing the frequency bandwidth of the medium to be compressed after the wave pulse has entered the medium so that information in the wave pulse is substantially preserved, wherein the wave pulse is of said type after the compression and the group velocity of the wave pulse is reduced by the compression.

41. The method of claim 40, further comprising causing the frequency bandwidth of the medium to be decompressed subsequent to the delaying so as to cause the wave pulse to propagate through the medium at a group velocity greater than the reduced group velocity and so that information in the wave pulse is substantially preserved.

42. The system of claim 41, said waveguide include optical fiber, or on-chip dielectric waveguide, or coupled resonator optical waveguide, or metallic waveguide, or transmission lines.

43. The method of claim 40, wherein the wave pulse is an electromagnetic pulse.

44. The method of claim 40, wherein the medium comprises waveguide and at least a first linear sequence of resonators coupled to the waveguide, said method further comprising causing the frequency bandwidth of the medium to be compressed by altering a resonance frequency of the resonators, or the propagating characteristics of the waveguide.

45. The method of claim 40, wherein the medium comprises a first linear sequence of resonators, each resonator between two resonators in the first sequence being located adjacent to such two resonators, wherein adjacent resonators are coupled to each other to permit propagation of the wave pulse along the first sequence, said method further comprising causing the frequency bandwidth of the medium to be compressed by altering a coupling constant of the coupling between adjacent resonators.

46. The method of claim 45, said wave pulse propagating along a direction in the medium, said medium being translationally invariant along said direction, wherein the altering alters the coupling constant of the coupling between adjacent resonators without altering the translational invariance of the medium.

47. The method of claim 40, the medium comprising a first and at least one additional linear sequence of resonators, said wave pulse propagating along the first sequence, each resonator in the at least one additional sequence being side coupled to a corresponding resonator in the first sequence, wherein each resonator in the first sequence and a corresponding resonator in the at least one additional sequence form a unit, the units formed by the two or more sequences being substantially the same so that the medium is substantially translationally invariant along a direction of propagation of the wave pulse, wherein the first sequence has a frequency bandwidth that can initially accommodate the frequency components of the wave pulse, and the at least one additional sequence has a frequency bandwidth is smaller than a frequency range spanned by the frequencies of the frequency components of the wave pulse, the two or more sequences having different frequency bandwidths, wherein the causing causes the frequency bandwidth of the medium to resemble that of the first sequence before the wave pulse enters the medium, and to resemble that of the at least one additional sequence after the wave pulse has entered the medium.

48. The method of claim 40, said medium comprising an optical material, wherein the causing causes a dielectric constant, or absorption or gain property, of the material to change.

49. The method of claim 48, wherein the causing causes the dielectric constant, or absorption or gain property, of the material to change by applying to it an electric or magnetic field, or an electromagnetic or acoustic wave, or mechanical force, or gravitational force.

50. The method of claim 40, said wave pulse propagating along a direction in the medium, said medium being translationally invariant along said direction, wherein said causing causes the frequency bandwidth of the medium to be compressed without altering the translational invariance of the medium.

51. A system for altering the spectrum of a wave pulse of a type, said wave pulse having frequency components, comprising:
- a medium having a frequency bandwidth that can initially accommodate the frequency components of the wave pulse, wherein said medium is substantially translationally invariant along the direction of wave pulse propagation, each frequency component of the wave pulse in the medium corresponding to a wavevector component and
- a device causing frequency of at least one wavevector component of the wave pulse to be altered after the pulse has entered the medium so that information in the pulse is substantially preserved, wherein the pulse is of said type before and after the altering.

52. The system of claim 51, wherein said device causes the spectrum of the wave pulse to be inverted while preserving information in the wave pulse.

* * * * *